United States Patent [19]
Honda et al.

[11] Patent Number: 5,233,274
[45] Date of Patent: Aug. 3, 1993

[54] DRIVE CIRCUIT FOR LANGEVIN TYPE ULTRASONIC BOLT-TIGHTENING MOTOR

[75] Inventors: Yasuyoshi Honda, Hamamatsu; Masahiko Komoda, Toyohashi; Keisuke Honda, Toyohashi; Toshiaki Miyamoto, Toyohashi; Yukinobu Tomida, Aichi; Masanori Sato, Toyohashi; Ryosuke Suganuma, Aichi; Hideo Kouzaka, Toyohashi, all of Japan

[73] Assignees: Asmo Co., Ltd., Shizuoka; Honda Electronics Co., Ltd., Aichi, both of Japan

[21] Appl. No.: 800,488

[22] Filed: Nov. 29, 1991

[30] Foreign Application Priority Data

Nov. 30, 1990 [JP] Japan .................. 2-340743
Nov. 30, 1990 [JP] Japan .................. 2-340744
Aug. 28, 1991 [JP] Japan .................. 3-244572

[51] Int. Cl.⁵ .......................... H01L 41/08
[52] U.S. Cl. .................. 318/116; 310/316; 310/323
[58] Field of Search .......... 310/316, 317, 319, 328, 310/321, 323, 325, 333; 318/116-118

[56] References Cited

U.S. PATENT DOCUMENTS

| 4,697,117 | 9/1987 | Mishiro | 310/323 |
| 4,709,182 | 11/1987 | Wenske et al. | 310/316 |
| 4,764,702 | 8/1988 | Mishiro | 310/323 |
| 5,124,611 | 6/1992 | Tamai et al. | 310/317 |

FOREIGN PATENT DOCUMENTS 2-74181 3/1990 Japan .

Primary Examiner—Mark O. Budd
Attorney, Agent, or Firm—Oliff & Berridge

[57] ABSTRACT

A drive circuit is used in a Langevin type ultrasonic bolt-tightening motor in which a motor drive voltage having a given frequency is applied to a piezo-electric element in a stator section, the resulting longitudinal and torsional vibrations being effective to rotate a motor section. The drive circuit has a longitudinal vibration sensor for detecting the longitudinal vibration in the stator section, a torsional vibration sensor for detecting vibration in the stator section and a frequency controller for controlling the frequency of the motor drive voltage such that the phase difference between the detection signals of the longitudinal and torsional vibration sensors becomes 90 degrees so as to provide maximum efficiency. Thus, the frequency of the motor drive voltage can be feedback controlled to maintain an optimum drive frequency despite the varying of the optimum drive frequency due to changes in various factors.

20 Claims, 28 Drawing Sheets

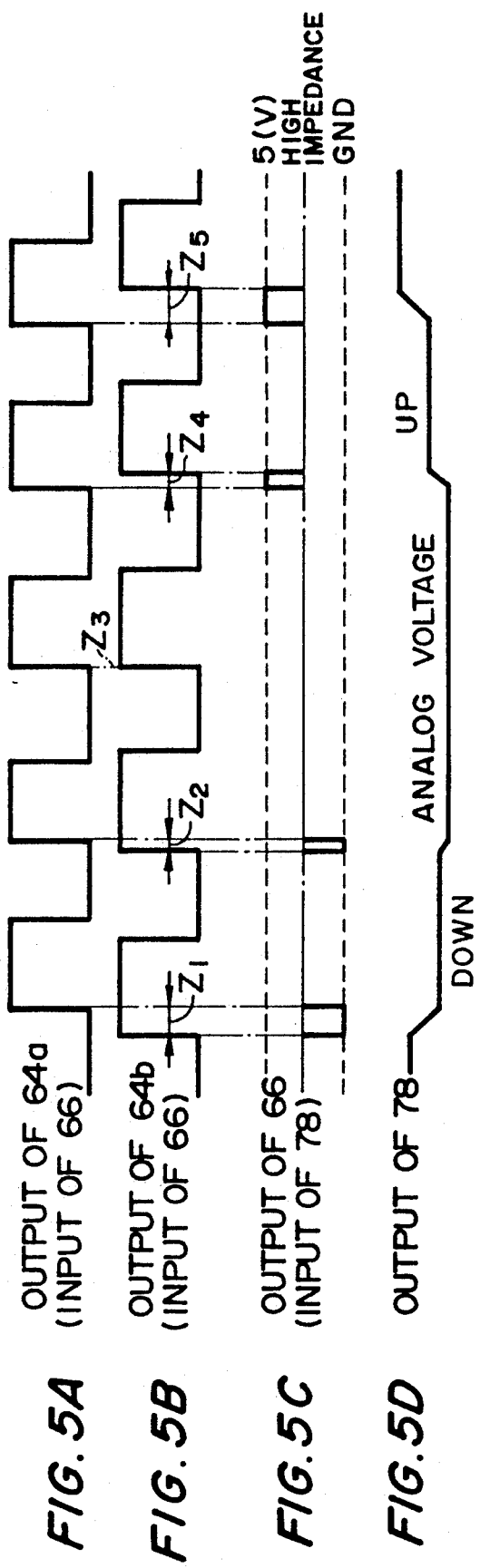

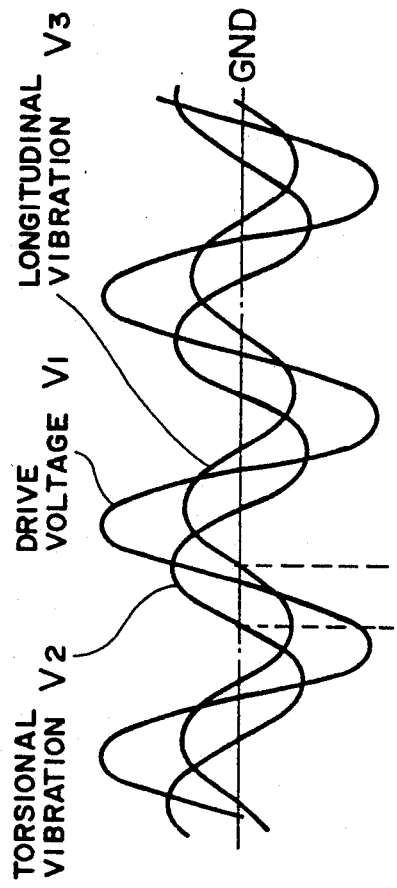
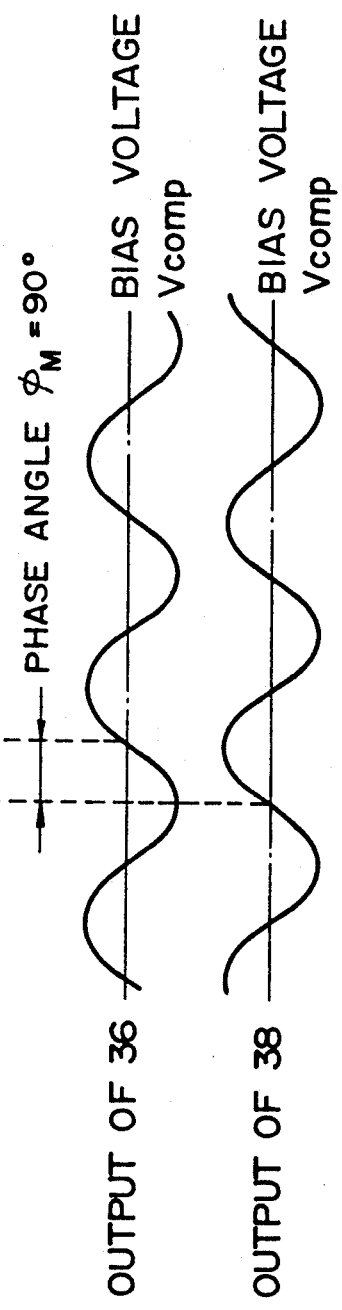
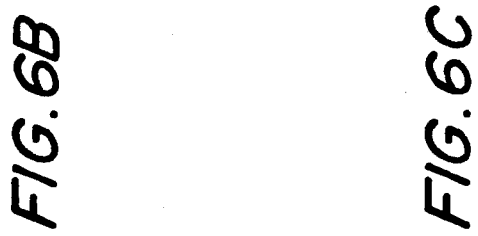
FIG.6A
FIG.6B
FIG.6C

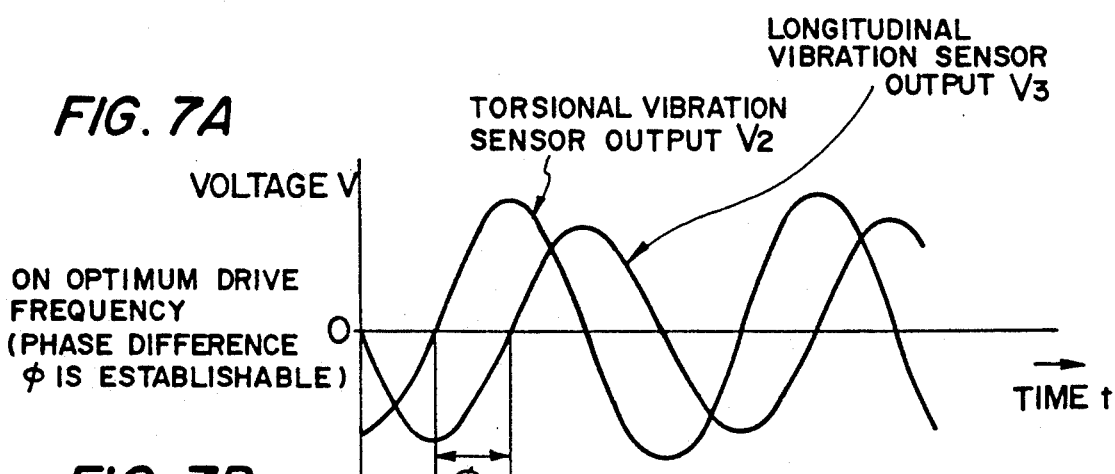
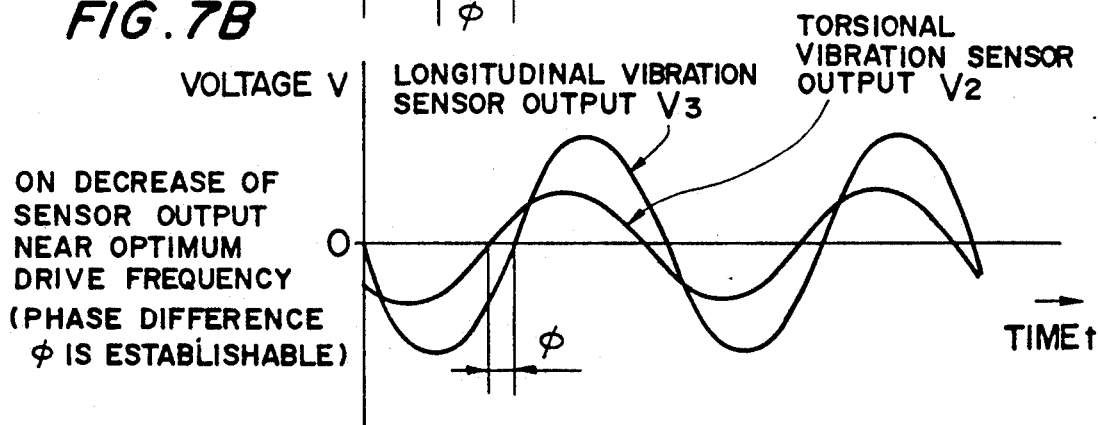
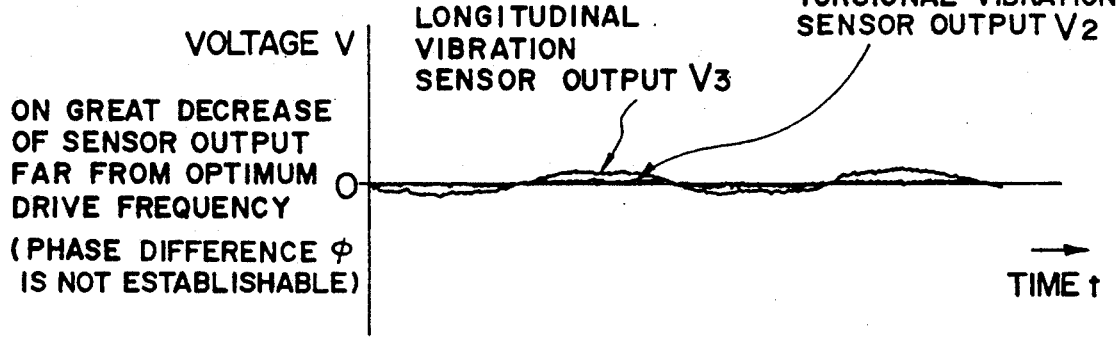
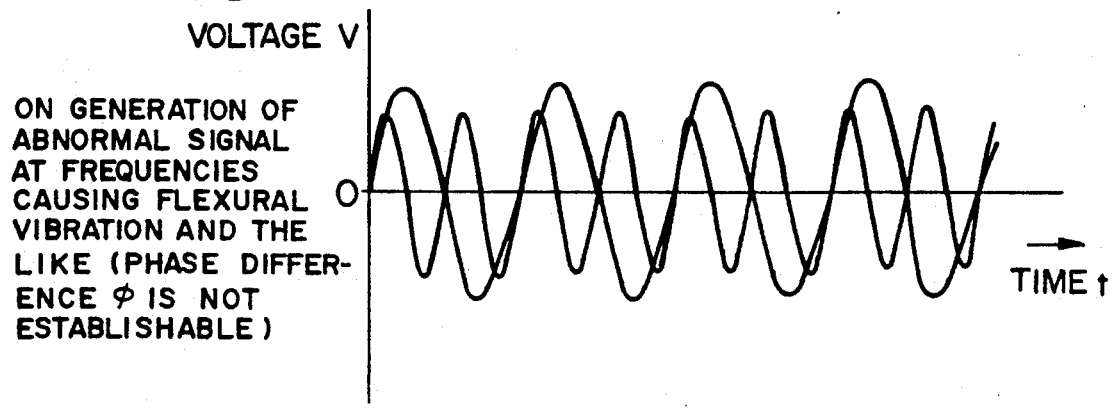

| FIG. 9A | FIG. 9B |

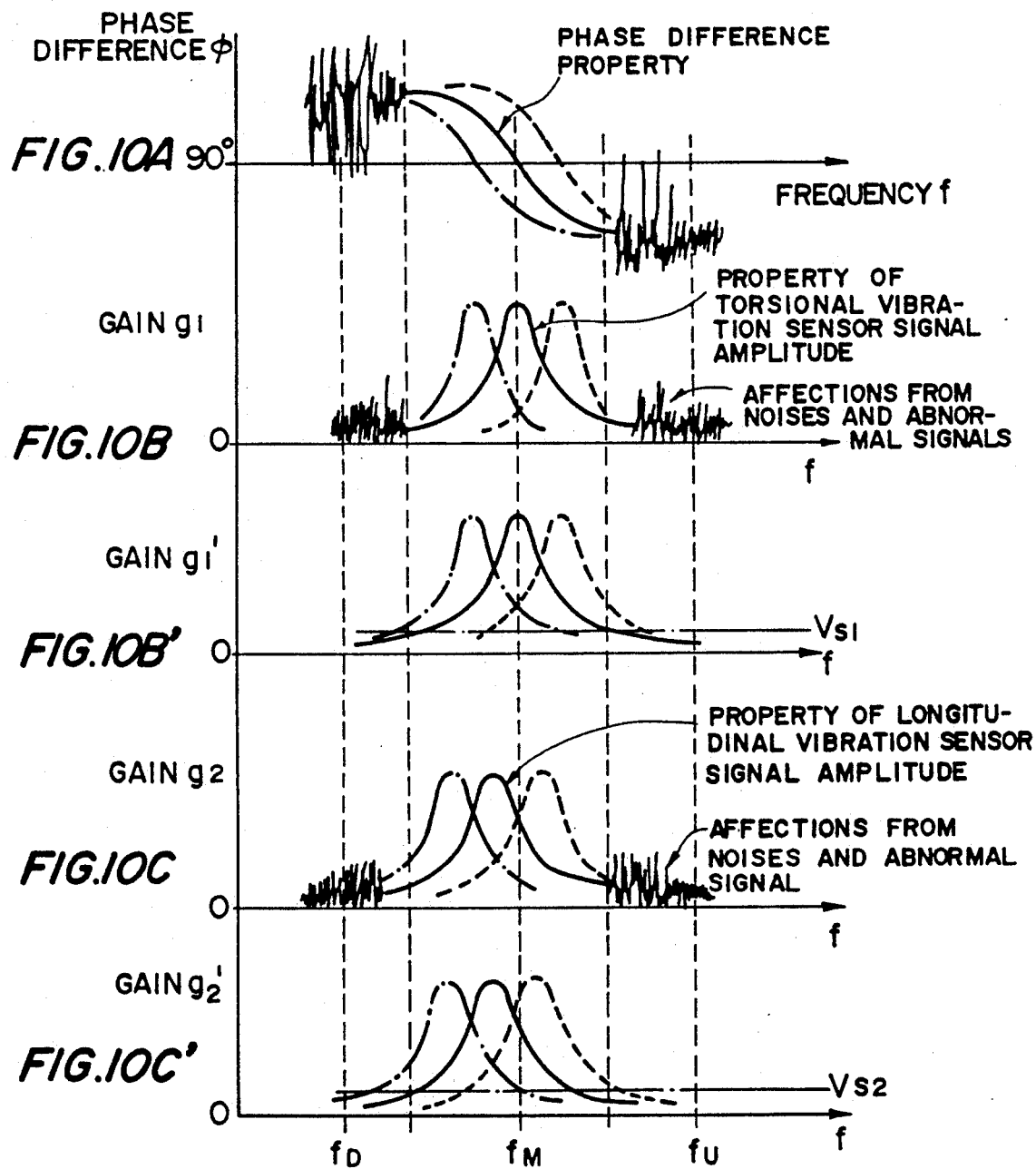

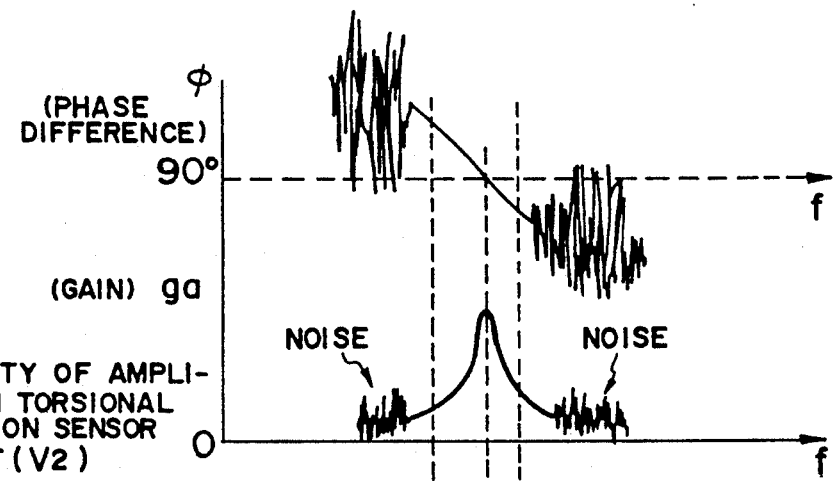
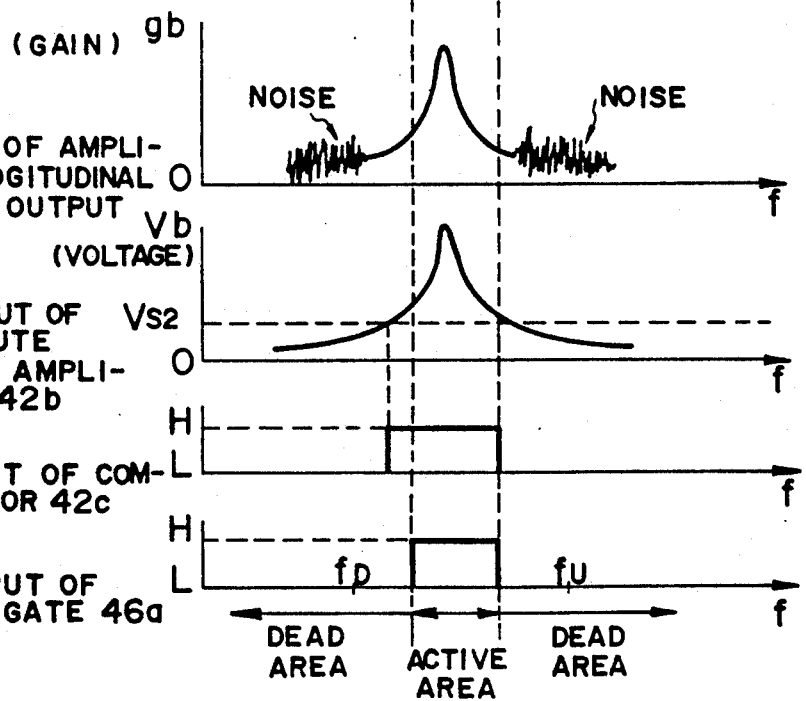

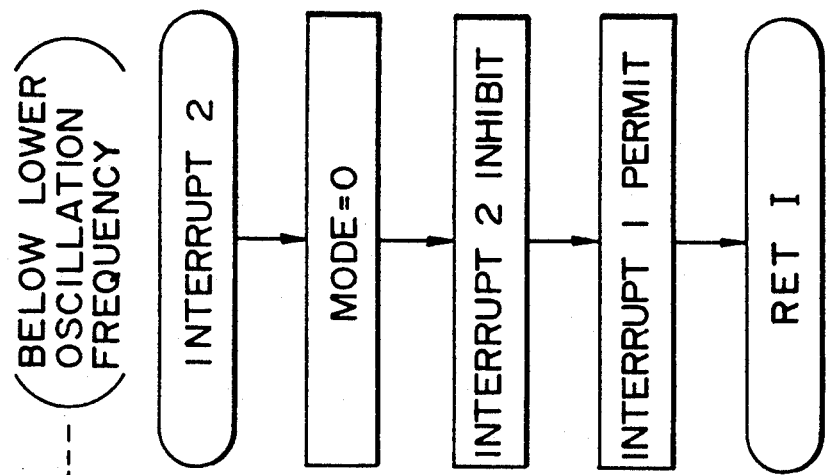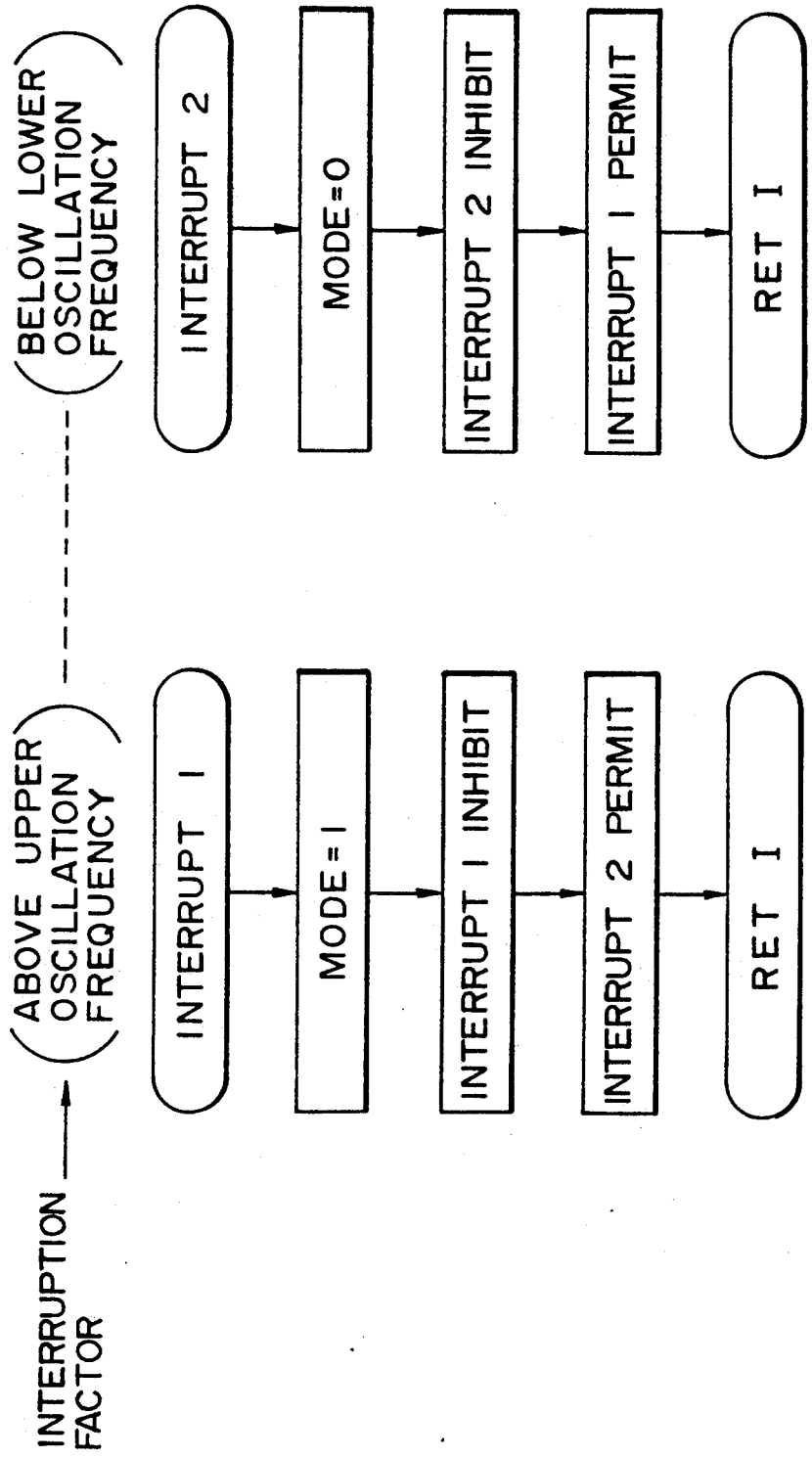

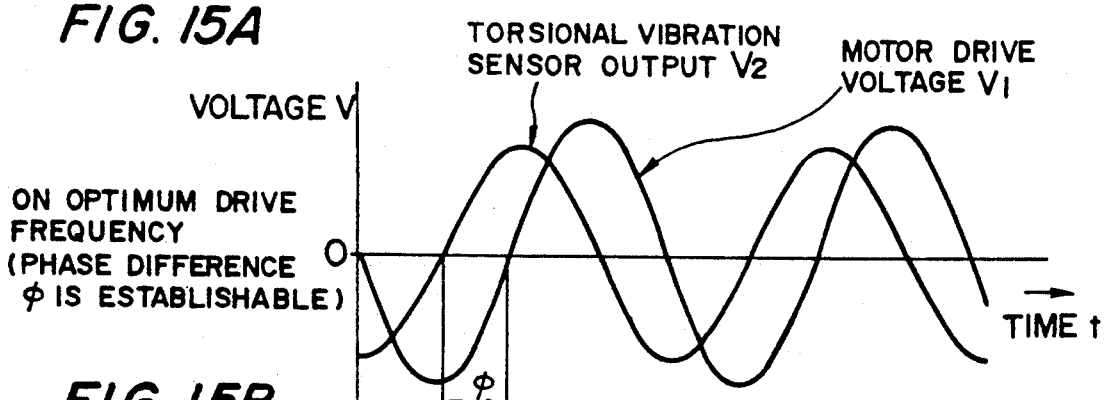

FIG. 15A
ON OPTIMUM DRIVE FREQUENCY (PHASE DIFFERENCE φ IS ESTABLISHABLE)

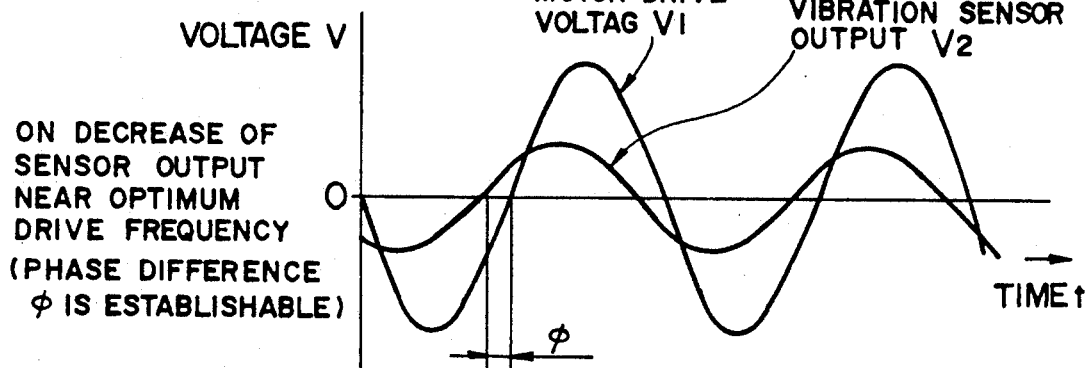

FIG. 15B
ON DECREASE OF SENSOR OUTPUT NEAR OPTIMUM DRIVE FREQUENCY (PHASE DIFFERENCE φ IS ESTABLISHABLE)

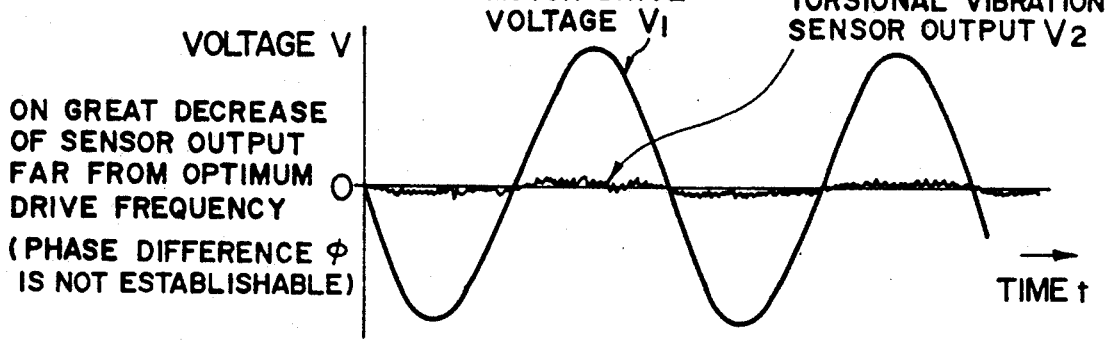

FIG. 15C
ON GREAT DECREASE OF SENSOR OUTPUT FAR FROM OPTIMUM DRIVE FREQUENCY (PHASE DIFFERENCE φ IS NOT ESTABLISHABLE)

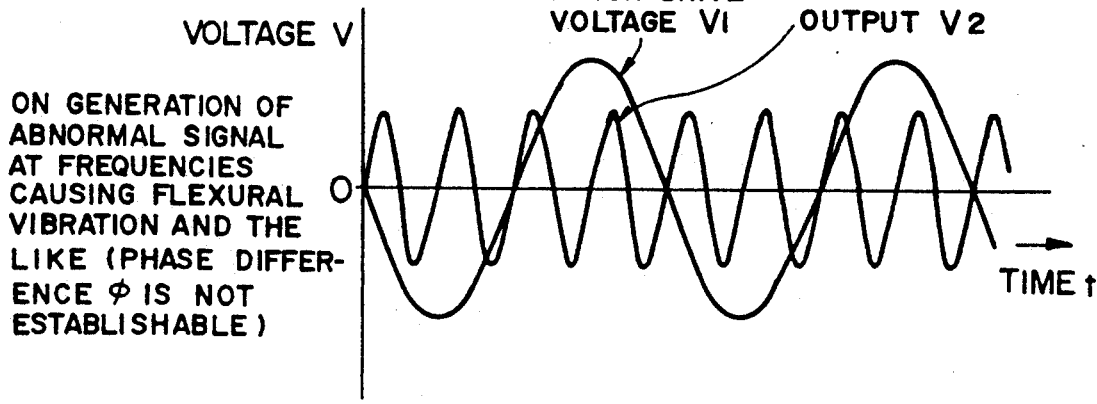

FIG. 15D
ON GENERATION OF ABNORMAL SIGNAL AT FREQUENCIES CAUSING FLEXURAL VIBRATION AND THE LIKE (PHASE DIFFERENCE φ IS NOT ESTABLISHABLE)

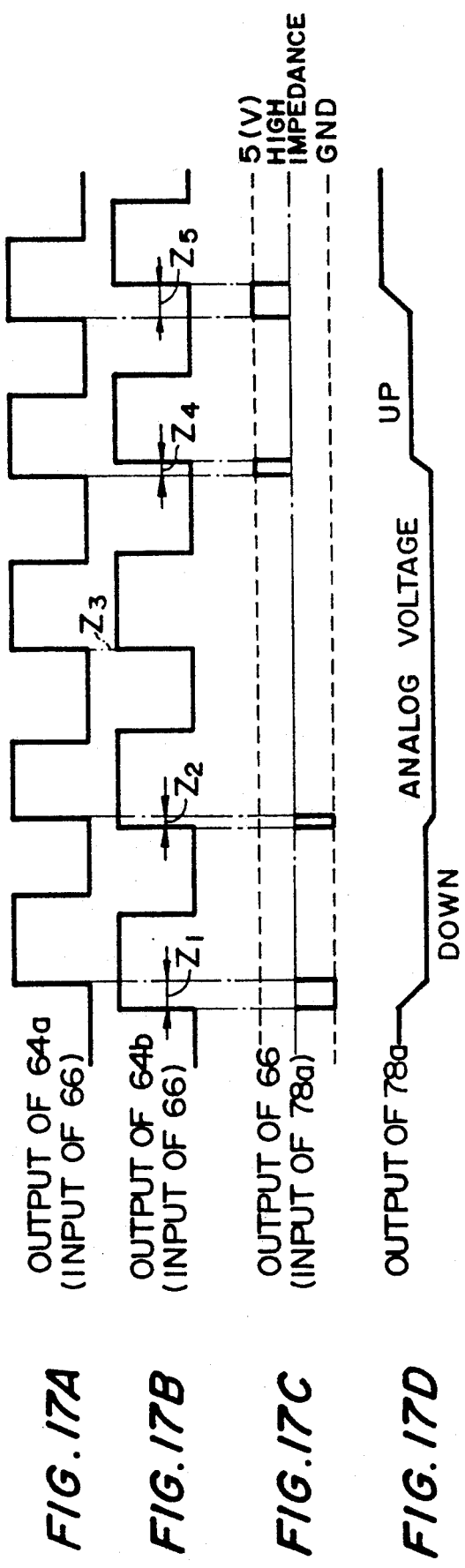

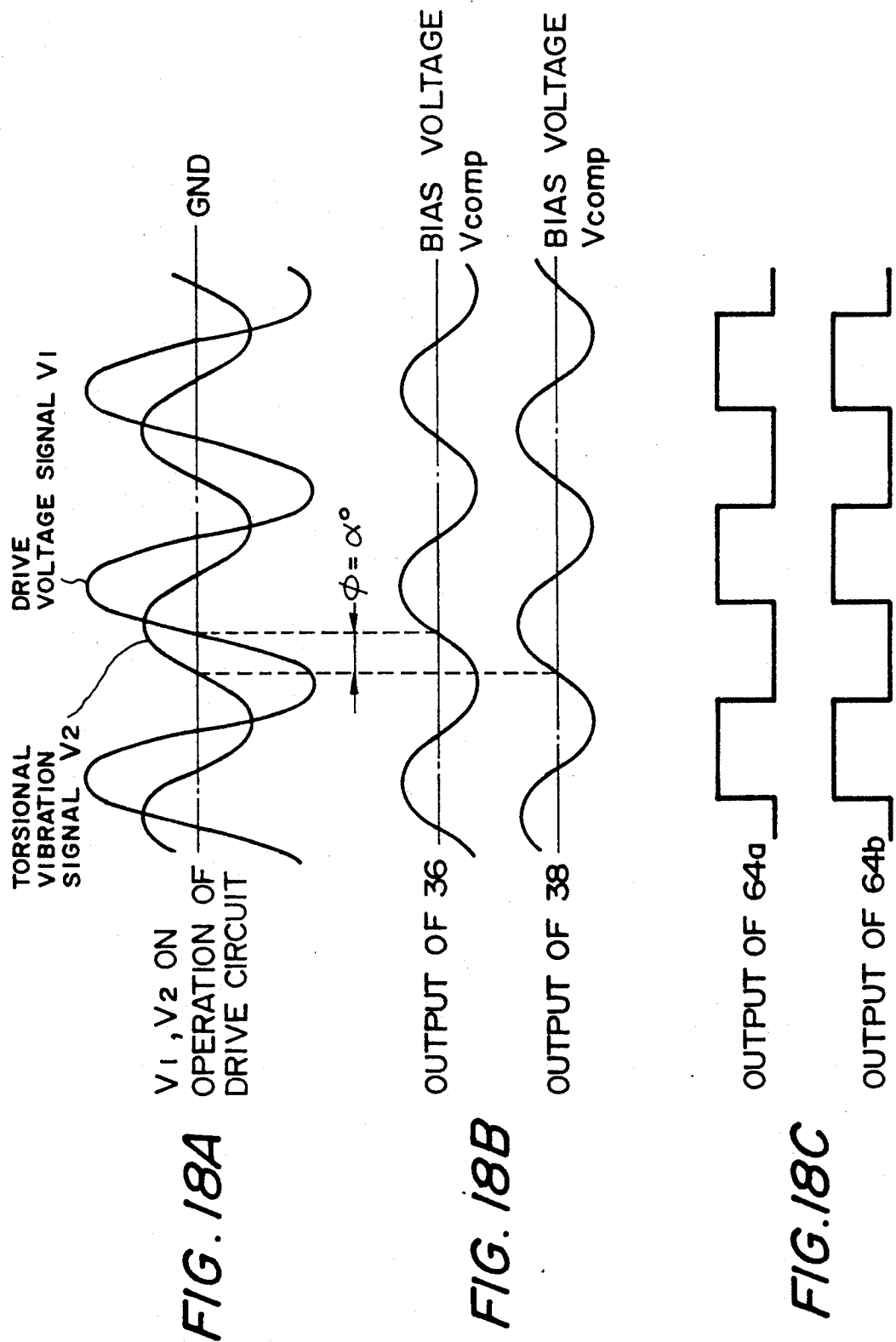

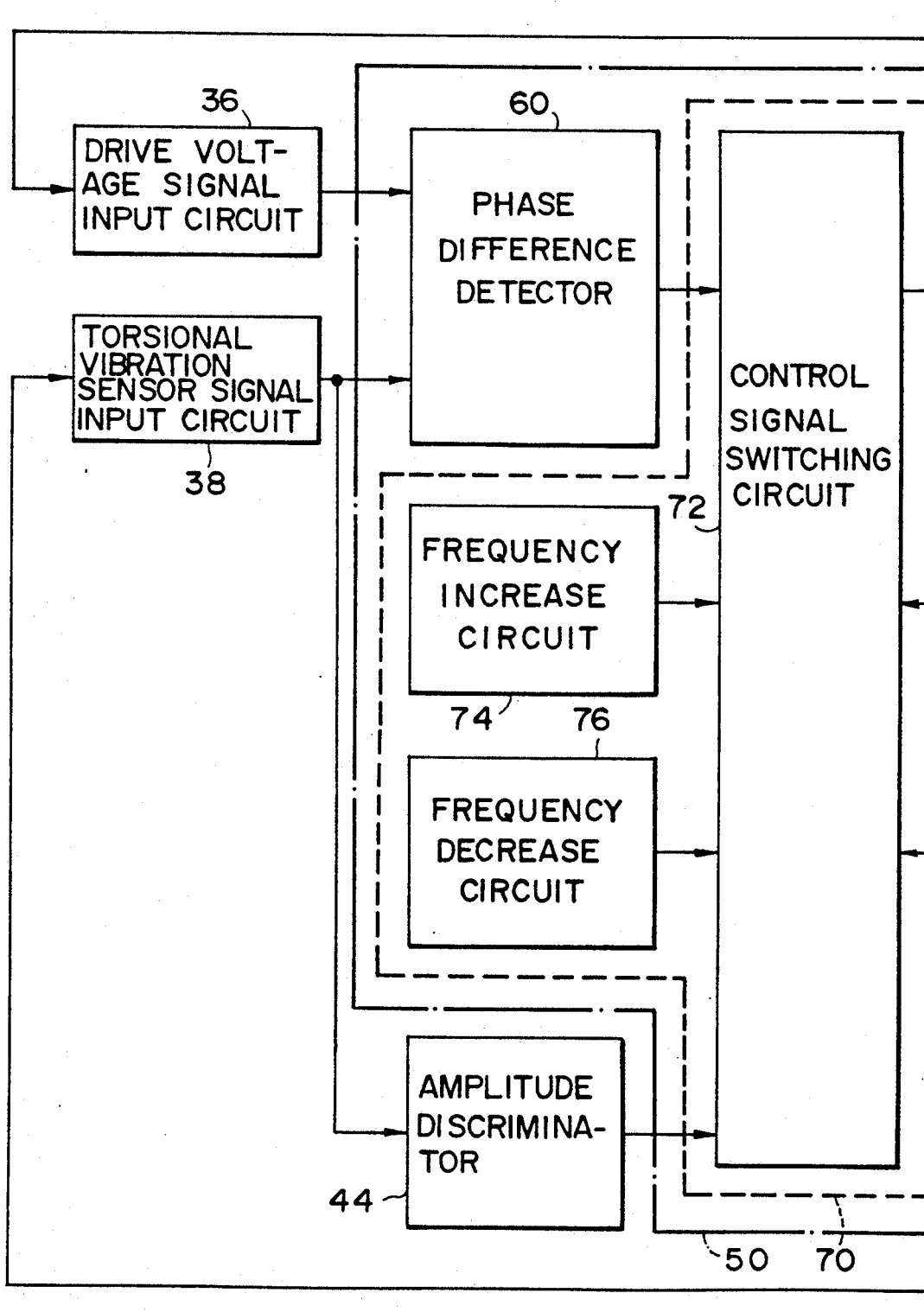

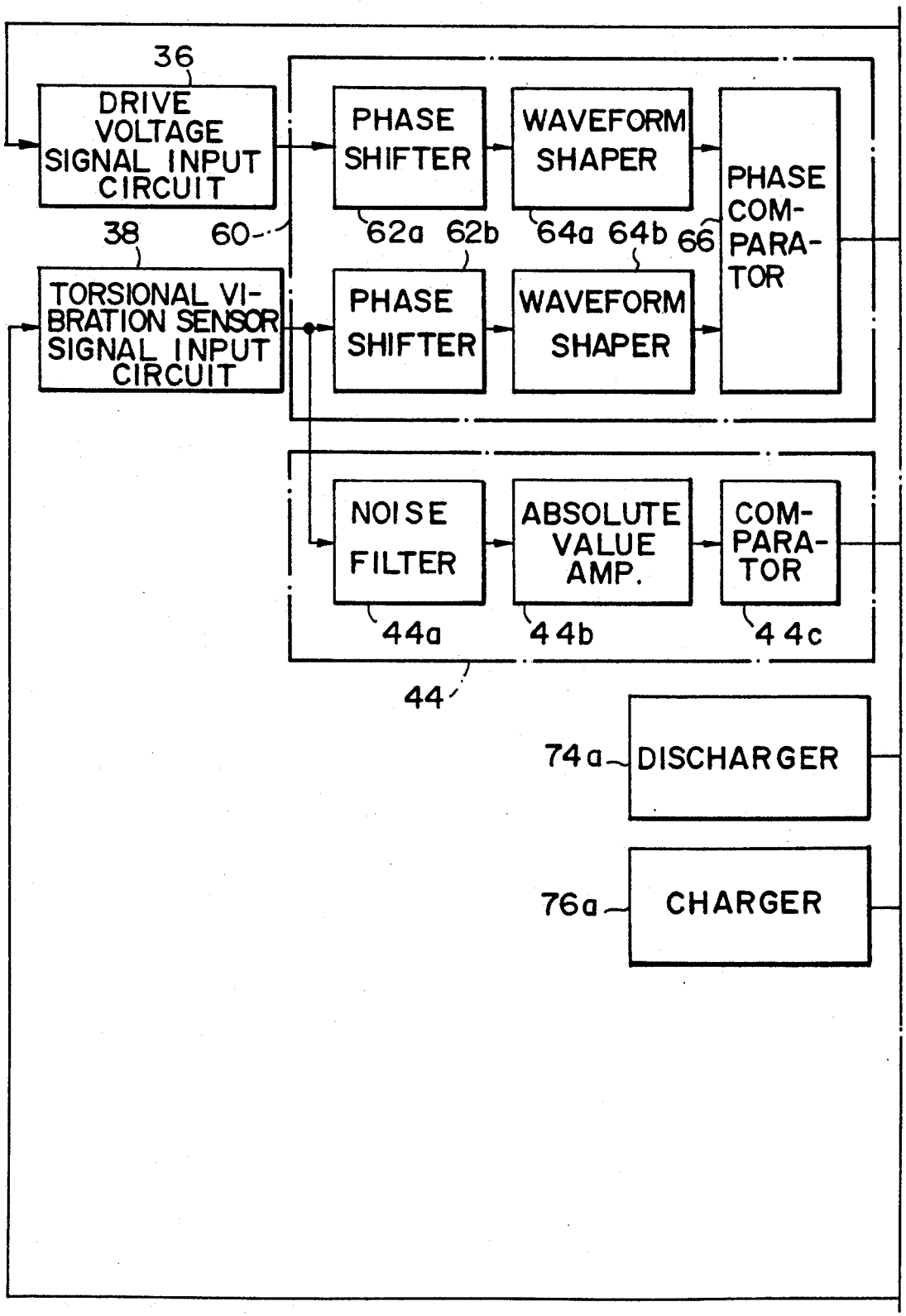

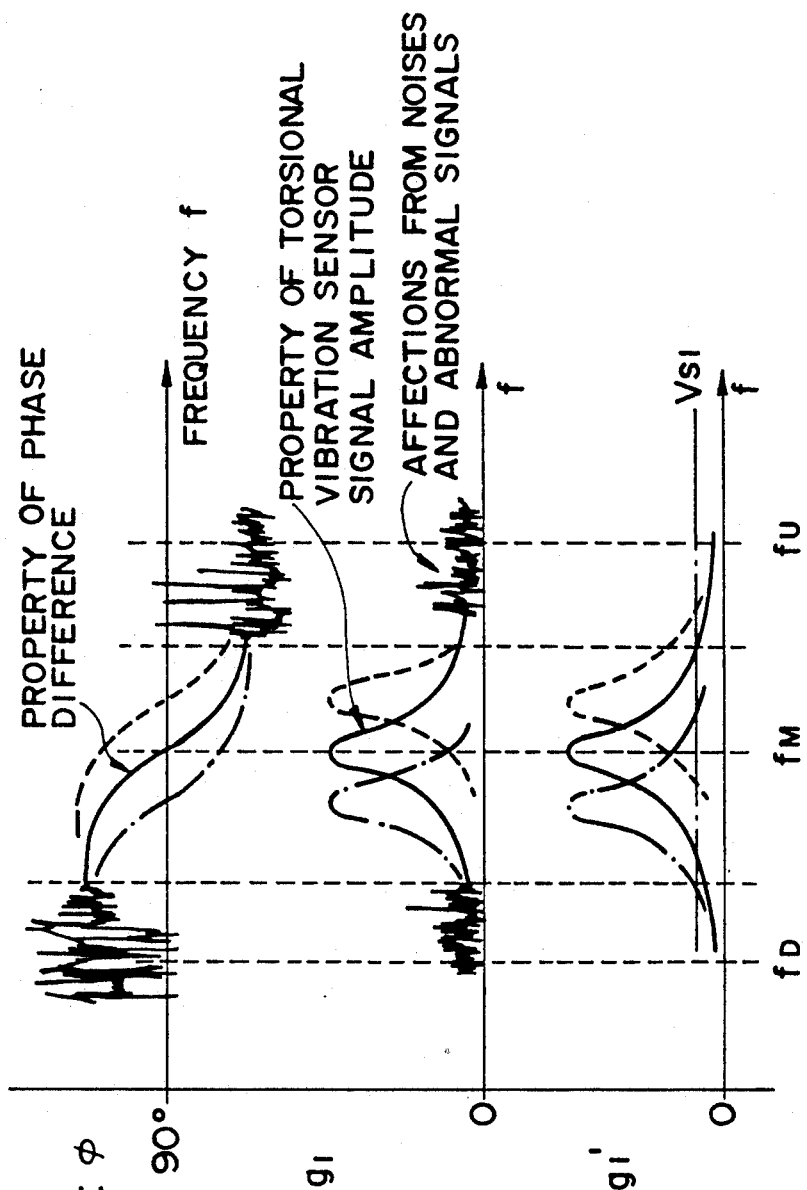

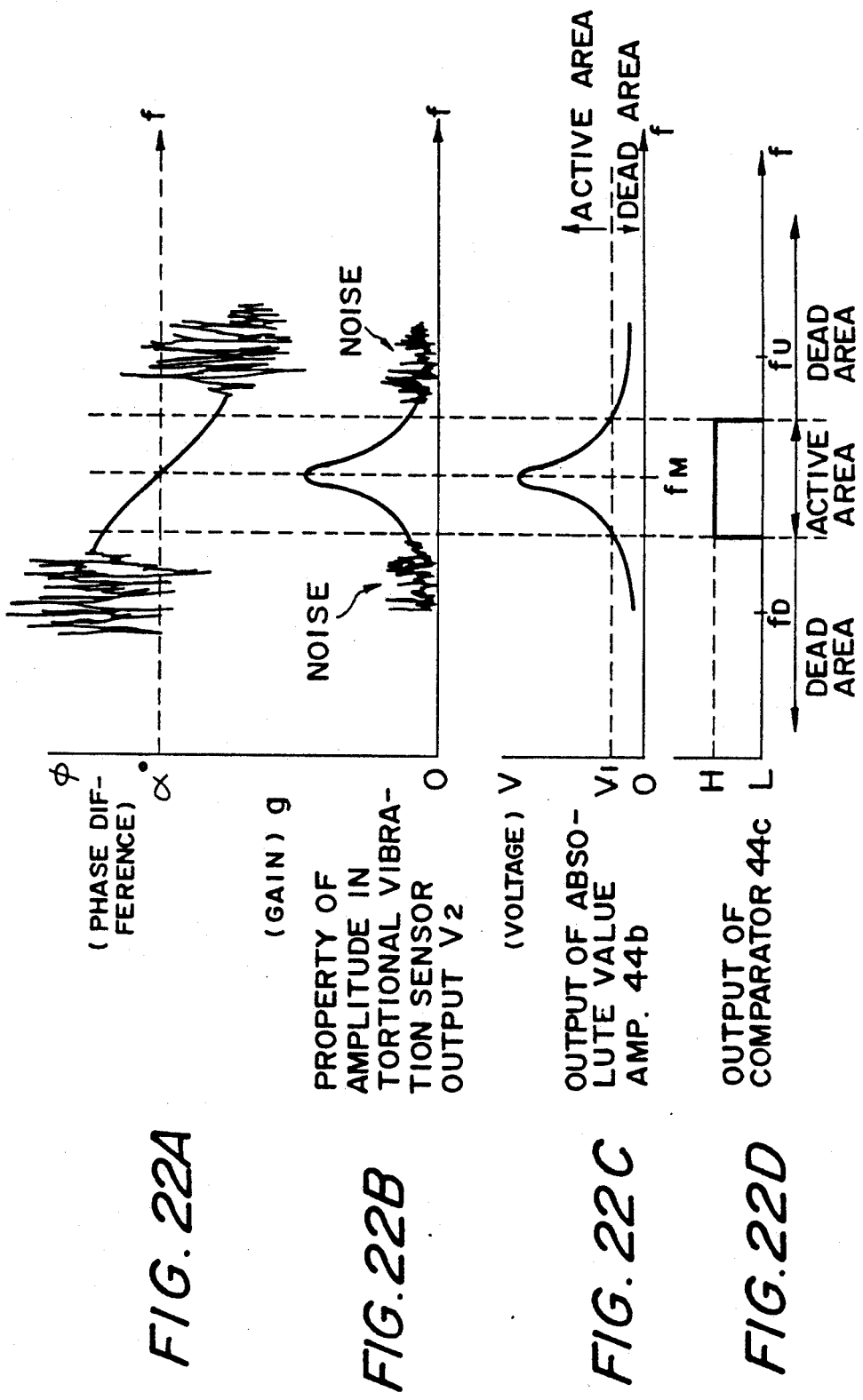

DRIVE CIRCUIT FOR LANGEVIN TYPE ULTRASONIC BOLT-TIGHTENING MOTOR

BACKGROUND OF THE INVENTION

1. Field of the Invention:

The present invention relates to a drive circuit for a Langevin type ultrasonic bolt-tightening motor.

2. Description of the Related Art:

The Langevin type ultrasonic bolt-tightening motor is desired for practical use since it was silent in operation and had a simplified structure. Further, such an ultrasonic motor has many other features, such as being capable of operating at a speed higher than that of the traveling-wave type ultrasonic motor.

The Langevin type ultrasonic bolt-tightening motor comprises a stator section including a piezo-electric element to which a motor drive voltage is applied and a rotor section is rotationally driven by longitudinal and torsional vibrations resulting from the application of the motor drive voltage to the piezo-electric element. The resulting torque depends on the frequency of the motor drive voltage. The maximum efficiency of generation of the torque is accomplished at a particular frequency (hereinafter called "optimum drive frequency").

The optimum drive frequency is inherent in a particular motor and has a very narrow band width. The optimum drive frequency is not always constant in operation and continuously varies depending on changes in various factors such as temperature in the element, magnitude of the load and the like.

The prior art could not electrically detect the variable optimum drive frequency for feedback control. In order to correct such a defect, the prior art should maintain the frequency of the motor drive voltage constant at all times or set it at a value near a frequency which appears to be the optimum drive frequency. Thus, the prior art could not feedback control the frequency of the motor drive voltage following the variable optimum drive frequency.

Therefore, the Langevin type ultrasonic bolt-tightening motor constructed in accordance with the prior art cannot perform efficiently since the generation of the drive torque is not accurately controlled.

SUMMARY OF THE INVENTION

It is therefore an object of the present invention to provide a drive circuit for a Langevin type ultrasonic bolt-tightening motor, which can feedback control the frequency of the motor drive voltage to follow the optimum drive frequency which depends on various operational conditions, thereby being capable of driving the motor in its optimum state at all times.

Another object of the present invention is to provide a drive circuit for a Langevin type ultrasonic bolt-tightening motor, which can start the motor reliably and cause the frequency of the motor drive voltage to follow the optimum drive frequency automatically.

To this end, the present invention provides a drive circuit for a Langevin type ultrasonic bolt-tightening motor comprising a stator section including a piezo-electric element to which a motor drive voltage having a predetermined frequency is applied and a rotor section rotationally driven by longitudinal and torsional vibrations resulting from the application of the motor drive voltage to the piezo-electric element, said drive circuit comprising;

a longitudinal vibration sensor for detecting and outputting the longitudinal vibration in said stator section;
a torsional vibration sensor for detecting and outputting the torsional vibration in said stator section;
and frequency control means for controlling the frequency of said motor drive voltage such that the phase difference between the signals detected by said longitudinal and torsional vibration sensors will be within a given range of an optimum phase angle of 90 degrees so as to provide maximum efficiency.

Preferably, said frequency control means comprises a phase difference detecting section for detecting a phase angle $\phi$ which corresponds to the phase difference between the signals detected by said longitudinal and torsional vibration sensors;
and a frequency regulating section for controlling the frequency of said motor drive voltage such that the phase angle $\phi$ detected by said phase difference detecting section will be a phase angle of 90 degrees so as to provide maximum efficiency.

It is also preferred that said torsional vibration sensor is fixedly mounted on said stator section at the side torsional vibration and that said longitudinal vibration sensor is fixedly mounted on said stator section in a plane perpendicular to the axis of said stator section at a location where longitudinal vibration is generated.

The inventors have conducted various types of experiments and have found that the frequency of the motor drive voltage can be detected indirectly when the frequency deviates from the optimum drive frequency.

From the results of these experiments, it has been found that even if the optimum drive frequency varies the phase difference between the longitudinal and torsional vibrations generated in the stator section, that is, the phase angle $\phi$, is within a given range of an optimum phase angle of 90 degrees as long as the frequency of the motor drive voltage is controlled to be maintained at the optimum drive frequency.

The present invention is based on such a fact.

In accordance with the present invention, a phase angle $\phi M$, is first detected which is a phase difference between an electrical signal V3 detected by the longitudinal vibration sensor on the basis of a longitudinal vibration and an electrical signal V2 detected by the torsional vibration, is detected sensor on the basis of a torsional vibration. The frequency of the motor drive voltage is then feedback controlled so that phase angle $\phi M$ becomes 90 degrees leading to the maximum efficiency. Thus, the frequency of the motor drive voltage can be maintained at the optimum drive frequency at all times.

In accordance with the present invention, therefore, the Langevin type ultrasonic bolt-tightening motor can always be driven with maximum efficiency by regulating the frequency of the motor drive voltage so that the phase angle $\phi M$ is within a given range of the optimum phase angle (about 90 degrees) at all times.

It is necessary to maintain the phase angle $\phi M$ to be always equal to 90 degrees at all times to drive the motor with maximum efficiency. The actual drive of the motor may be controlled such that the phase angle $\phi M$ is varied within a given range of the optimum phase angle of 90 degrees, for example, $85° < \phi M < 95°$.

The present invention also provides a drive circuit for a Langevin type ultrasonic bolt-tightening motor comprising a stator section including a piezo-electric element to which a motor drive voltage having a predetermined frequency is applied and a rotor section rotationally driven by longitudinal and torsional vibrations resulting from the application of the motor drive voltage to the piezo-electric element, said drive circuit comprising;

a torsional vibration sensor for detecting and outputting the torsional vibration in said stator section;

and frequency control means for controlling the frequency of said motor drive voltage such that the phase difference between said motor drive voltage signal and said signal detected by said torsional vibration sensor will be within a given range of an optimum angle $\alpha$ so as to provide maximum efficiency.

Said frequency control means preferably includes;

a phase difference detecting section for detecting a phase angle $\phi$ corresponding to the phase difference between said motor drive voltage signal and the signal detected by said torsional vibration sensor;

and a frequency regulating section for controlling the frequency of said motor drive voltage such that the phase angle $\phi$ detected by said phase difference detecting section will be within a given range of an optimum phase angle a so as to provide; maximum efficiency.

It is also preferred that said torsional vibration sensor is fixedly mounted on a side of said stator section where torsional vibration is generated.

The inventors have conducted various types of experiments and have found that the frequency of the motor drive voltage can be detected indirectly when it deviates from the optimum drive frequency.

From the results of these experiments, it has been found that even if the optimum drive frequency varies, the phase difference between the motor drive voltage and the torsional vibration generated in the stator section, that is, the phase angle $\phi$ is within a given range of an optimum phase angle $\alpha$, as long as the frequency of the motor drive voltage is controlled to be maintained at the optimum drive frequency.

The present invention is based on such a fact.

In accordance with the present invention, a phase angle $\phi$, which is a phase difference between an electrical signal V2 detected by the torsional vibration sensor on the basis of a torsional vibration and a motor drive voltage V1 having a predetermined frequency, is detected. The frequency of the motor drive voltage is then feedback controlled so that the detected phase angle $\phi$ is within a given range of an optimum phase angle $\alpha$ so as to provide maximum efficiency. Thus, the frequency of the motor drive voltage can be maintained at the optimum drive frequency at all times.

In accordance with the present invention, therefore, the Langevin type ultrasonic bolt-tightening motor can always be driven with maximum efficiency by regulating the frequency of the motor drive voltage so that the phase angle $\phi$ remains equal to a value $\alpha$ at all times.

By controlling the phase angle $\phi M$ to be always equal to an angle $\alpha$, the motor is driven with maximum efficiency. The actual drive of the motor may be controlled such that the phase angle $\phi M$ is varied within a given range of an optimum phase angle $\alpha$.

As described above, the present invention is so constructed that the frequency of the motor drive voltage to be applied to the piezo-electric element automatically tracks the optimum drive frequency at all times by detecting vibrations in the stator section by the use of vibration sensor means.

Although the Langevin type ultrasonic bolt-tightening motor can automatically cause the motor drive voltage to follow the optimum drive frequency when the output signal of each of the vibration sensors is stable at its sufficient amplitude, such a motor cannot automatically track the optimum drive frequency if the amplitude of the sensor output decreases or the sensor output signal becomes abnormal.

More particularly, when the Langevin type ultrasonic bolt-tightening motor is driven with a motor drive voltage equal to the optimum drive frequency significant, longitudinal and torsional vibrations can be generated in the stator section. Thus, each of the vibration sensors generates a signal having a stable amplitude to establish a reliable phase in the sensor signal. As a result, the motor drive voltage can automatically track the optimum drive frequency, as described.

If the frequency of the motor drive voltage becomes farther from the optimum drive frequency, however, the longitudinal and torsional vibrations decrease to reduce the outputs of the vibration sensors, such that the phases in the sensor signals become ambiguous. Thus, the motor drive voltage will not be capable of automatically tracking the optimum drive frequency.

Further, if the frequency of the motor drive voltage is equal to a frequency other than those of the longitudinal and torsional vibrations, such as a frequency generating a flexural vibration or the like, there may be generated an abnormal signal having a frequency different from the frequency of the drive voltage V1 (hereinafter called "abnormal signals") from the vibration sensor. This also results in the motor drive voltage not being able to automatically track the optimum drive frequency.

In other words, it is required that in order to track the optimum drive frequency, the frequency of the motor drive voltage has been set at a value near the optimum drive frequency during energization of the motor. However, the optimum drive frequency varies due to changes in various factors such as temperature, load and the like even if the same motor is being used. Moreover, the frequency of the motor drive voltage will be different from one motor to another. Consequently, the frequency of the motor drive voltage cannot be fixedly established at a value near the optimum drive frequency during energization of the motor. Under such variable situations, the automatic tracking of the optimum drive frequency cannot be attained.

In order to overcome such a problem, the present invention provides;

a drive circuit of the above type which further comprises;

a sensor output discriminating means responsive to a detection signal from said vibration sensor or sensors for discriminating whether the detection signal is in an active area in which the motor is controllable or in a dead area in which the motor is difficult to control;

and wherein said frequency control means is operative to control the frequency of the motor drive voltage so as to move the detection signal from the vibration sensor or sensors to the active area when said detection signal is in the dead area;

and also operative to control the frequency of the motor drive voltage so as to maintain the frequency at the optimum drive frequency when said detection signal is in the active area.

In such a manner, the sensor output discriminating means of the present invention can determine whether the output of the vibration sensor or sensors is in the active or dead area. If the output of that vibration sensor is in the dead area, the frequency control means controls the frequency of the motor drive voltage so that the output signal of the vibration sensor will be moved to the active area. After the output signal of the vibration sensor has to be moved to the active area, the frequency control means is responsive to that output signal to control the frequency of the motor drive voltage to the optimum drive frequency.

In such a manner, the drive circuit of the present invention can start the motor by moving the output signal of the vibration sensor or sensors to the active area even if that output signal is very low or unstable.

After start of the motor, the drive circuit feedback controls the frequency of the motor drive voltage to follow the optimum drive frequency which varies due to changes in various operational factors such that the motor can always be driven under optimum conditions.

Even if the output signal of each of the vibration sensors moves to the dead area for any reason during operation of the motor, the drive circuit can return the output signal of the vibration sensor to the active area, resulting in re-start of the motor with the optimum drive frequency.

BRIEF DESCRIPTION OF THE DRAWINGS

FIG. 3 shows the characteristics of the Langevin type ultrasonic bolt-tightening motor.

FIG. 5 is a diagram showing waveforms in various parts of the motor drive circuit shown in FIG. 4.

FIG. 6 is a diagram showing waveforms in various parts of the drive circuit when the motor drive voltage is controlled to the optimum drive frequency.

FIG. 7 shows the output characteristics of the respective sensors in the Langevin type ultrasonic bolt-tightening motor: FIG. 7(A) illustrates waveforms when the frequency of the motor drive voltage is controlled to the optimum drive frequency; FIG. 7(B) illustrates waveforms when the frequency of the motor drive voltage is in the active area, resulting in reduction of its amplitude; FIG. 7(C) illustrates waveforms when the frequency of the motor drive voltage is in the dead area, resulting in reduction of its amplitude; FIG. 7(D) illustrates waveforms when the frequency of the motor drive voltage is in the dead area, resulting in generation of abnormal signals at the outputs of the vibration sensors.

FIG. 10 illustrates variable characteristics of the motor depending on various operational factors such as temperature, load and the like: FIG. 10(A) is a graph illustrating the relationship between the frequency of the motor drive voltage and the phase difference between the output signals of the longitudinal and torsional vibration sensors; FIG. 10(B) is a graph illustrating the relationship between the frequency of the motor drive voltage and the amplitude of the output signal from the torsional vibration sensor; FIG. 10(C) is a graph illustrating the frequency of the motor drive voltage and the amplitude of the output signal from the longitudinal vibration sensor; FIG. 10(B') is a graph illustrating the relationship between the frequency of the motor drive voltage and the amplitude of the signal of the torsional vibration sensor after noise and abnormal signal components have been removed therefrom; and FIG. 10(C') is a graph illustrating the relationship between the frequency of the motor drive voltage and the amplitude of the signal of the longitudinal vibration sensor after noise and abnormal signal components have been removed therefrom.

FIGS. 11A thru 11H are views illustrating the operation of the sensor output discriminating means shown in FIG. 9.

FIG. 12 is a flow chart illustrating the control realized with any computer control such as MPU, in the second embodiment: FIGS. 12(B) and 12(C) are flow charts showing the interrupt routine.

FIG. 14 illustrates the characteristics of the Langevin type ultrasonic bolt-tightening motor of the third embodiment.

FIG. 15 shows the motor drive voltage and sensor output characteristics in the Langevin type ultrasonic bolt-tightening motor: FIG. 15(A) illustrates waveforms when the frequency of the motor drive voltage is controlled to the optimum drive frequency; FIG. 15(B) illustrates waveforms when the frequency of the motor drive voltage is in the active area, resulting in reduction of its amplitude; FIG. 15(C) illustrates waveforms when the frequency of the motor drive voltage is in the dead area, resulting in reduction of its amplitude; FIG. 15(D) illustrates waveforms when the frequency of the motor drive voltage is in the dead area, resulting in generation of abnormal signals at the outputs of the vibration sensors.

FIGS. 17A thru 17D shows waveforms at various parts in the motor drive circuit of FIG. 16 when the motor is operating.

FIGS. 18A thru 18C shows waveforms at various parts in the motor drive circuit when the motor drive voltage is controlled to the optimum drive frequency.

FIGS. 19, 19A and 19B show block circuit diagrams of a fourth preferred embodiment of a Langevin type ultrasonic bolt-tightening motor constructed in accordance with the present invention.

FIGS. 20, 20A and 20B are views illustrating the detailed arrangement of the drive circuit shown in FIG. 19.

FIG. 21 illustrates variable characteristics of various operational factors such as temperature, load and the like: FIG. 21(A) is a graph illustrating the relationship between the frequency of the motor drive voltage and the phase difference between the motor drive voltage and the torsional vibration sensor output signal; FIG. 21(B) is a graph illustrating the relationship between the frequency of the motor drive voltage and the amplitude of the torsional vibration sensor output signal; FIG. 21(B') is a graph illustrating the relationship between the frequency of the motor drive voltage and the amplitude of the torsional vibration sensor output signal after noise and abnormal signal components have been removed therefrom.

FIG. 22 is a view illustrating the operation of the sensor output discriminating means shown in FIG. 20.

FIG. 23 is a view illustrating the realization of the fourth embodiment control with any computer control such as MPU.

DETAILED DESCRIPTION OF THE PREFERRED EMBODIMENTS

First Embodiment

Figure 1:
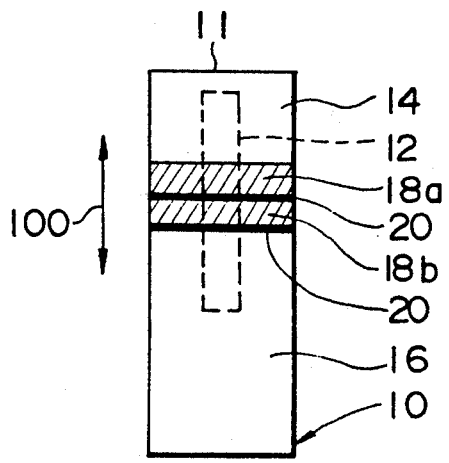
FIG. 1 is a view showing the basic arrangement of a Langevin type ultrasonic bolt-tightening motor to which the present invention is applied.
Figure 2:
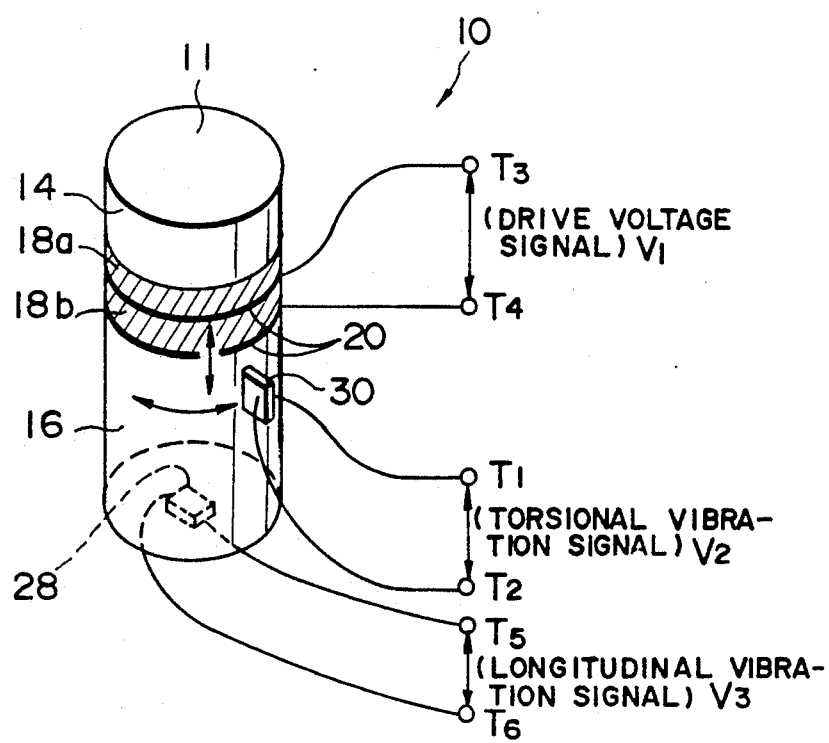
FIG. 2 is a schematically perspective view of the stator section used in the motor of FIG. 1.

Referring to FIGS. 1 and 2, there is shown the first preferred embodiment of a Langevin type ultrasonic bolt-tightening motor to which the present invention is applied.

The Langevin type ultrasonic bolt-tightening motor 10 comprises a stator section 11 and a rotor (not shown) which is mounted on the stator section 11 at one end face.

The stator section 11 includes piezo-electric elements 18a, 18b and block members 14, 16. Each of the block members 14, 16 is of a cylindrical configuration having a central threaded bore which is threadedly connected by a bolt 12.

The piezo-electric elements 18a and 18b are located between the block members 14 and 16 and so constructed that a preselected motor drive voltage V1 is applied to these elements through electrodes 20 via terminals T3 and T4. As an AC voltage having a given frequency is applied to the electrodes 20, a longitudinal vibration is generated in the piezo-electric elements 18 in a vertical or element thickness direction as shown by arrow 100. The longitudinal vibration is transmitted to the block members 14 and 16. Since the block members 14 and 16 are firmly connected together by the bolt 12, a torsional vibration will be generated in the block members 14 and 16 through the threads. Thus, an elliptic vibration appears on the end face of each of the block members 14 and 16 from that the longitudinal and torsional vibrations are combined together. If a rotor (not shown) is mounted on the block member 14 at the upper end, this rotor can be rotationally driven by the elliptic vibration generated on the end face of the block member 14.

The magnitude of the resulting torque greatly depends on the frequency of the motor drive voltage. The efficiency at which the torque is generated becomes maximum at a particular frequency which is called an optimum drive frequency. The optimum drive frequency is inherent in a particular motor used and yet has a relatively narrow band. Further, the optimum drive frequency does not remain constant during operation of the motor and varies due to changes in various factors such as temperature, load and the like. In order to drive the ultrasonic motor with high efficiency, the variable optimum drive frequency must always be detected to control the frequency of the motor drive voltage.

The prior art could not electrically detect the variable optimum drive frequency and control and maintain the motor drive voltage following at the variable optimum drive frequency.

The first feature of the present invention is that the frequency of the motor drive voltage can be controlled even under the aforementioned situation.

To this end, the first embodiment comprises a longitudinal vibration sensor 28 for electrically detecting the longitudinal vibration signal generated in the stator section 11 and a torsional vibration sensor 30 for detecting an electric signal corresponding to the torsional vibration generated in the stator section 11.

In the first embodiment, each of the vibration sensors 28 and 30 is of a piezo-electric type which is composed of piezo-electric elements and electrode means.

As well known in the art, the torsional vibration generated in the stator section 11 includes antinodes representative of peak amplitude and nodes indicative of zero amplitude. The positions of these antinodes and nodes are invariable if the configuration of the stator section 11 is unchanged. It is thus preferred that the torsional vibration sensor 30 is mounted on the stator section 11 such that the sensor is located at any antinode in the torsional vibration. In the first embodiment, the torsional vibration sensor is fixedly mounted on the side of the block member 16 in position.

In such an arrangement, the torsional vibration generated in the stator section 11 can be easily detected by the piezo-electric torsional vibration sensor 30 to produce a torsional vibration signal V2 which is in turn outputted through terminals T1 and T2.

It is further preferred that the longitudinal vibration sensor 28 is mounted on the stator section 11 such that the longitudinal vibration can be detected without affecting the torsional vibration. In the first embodiment, the longitudinal vibration sensor is fixedly mounted on the bottom face of the block member 16 to meet such a condition. If the longitudinal vibration sensor 28 is mounted on the side of the stator section 11, it is preferred that the plate surface of that sensor is positioned in a plane perpendicular to the axis of the stator section 11. It is further preferred that the sensor 28 is positioned at any node in which the value of the torsional vibration becomes zero. This is true of the other embodiments of the present invention which will be described hereinafter.

Thus, the longitudinal vibration generated in the stator section 11 will be detected by the longitudinal vibration sensor 28 and outputted as a longitudinal vibration signal V3 through terminals T5 and T6. At this time, the frequency of the longitudinal vibration will be substantially the same as that of the torsional vibration unless there is any disturbance.

The ultrasonic motor of the present invention is responsive to a phase difference $\phi$ between the longitudinal and torsional vibrations detected by the longitudinal and torsional vibration sensors 28 and 30 to indirectly detect whether or not the frequency of the motor drive voltage V1 is the optimum drive frequency.

In other words, the inventors have found that even if the optimum drive frequency is varied, the phase difference between the longitudinal and torsional vibrations generated in the stator section 11, that is, the phase angle φ, becomes 90 degrees at all times as long as the frequency of the motor drive voltage V1 is controlled to be maintained at the optimum drive frequency.

Figure 3A:
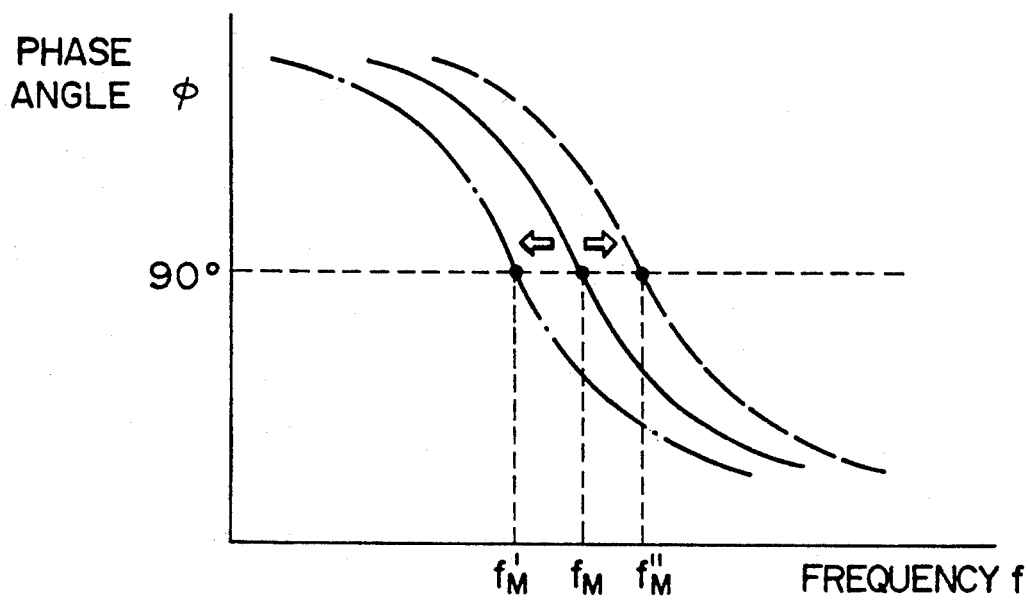
FIG. 3(A) is a graph illustrating the relationship between the frequency f of the motor drive voltage and the phase difference between the longitudinal and torsional vibrations generated in the stator section.
Figure 3B:
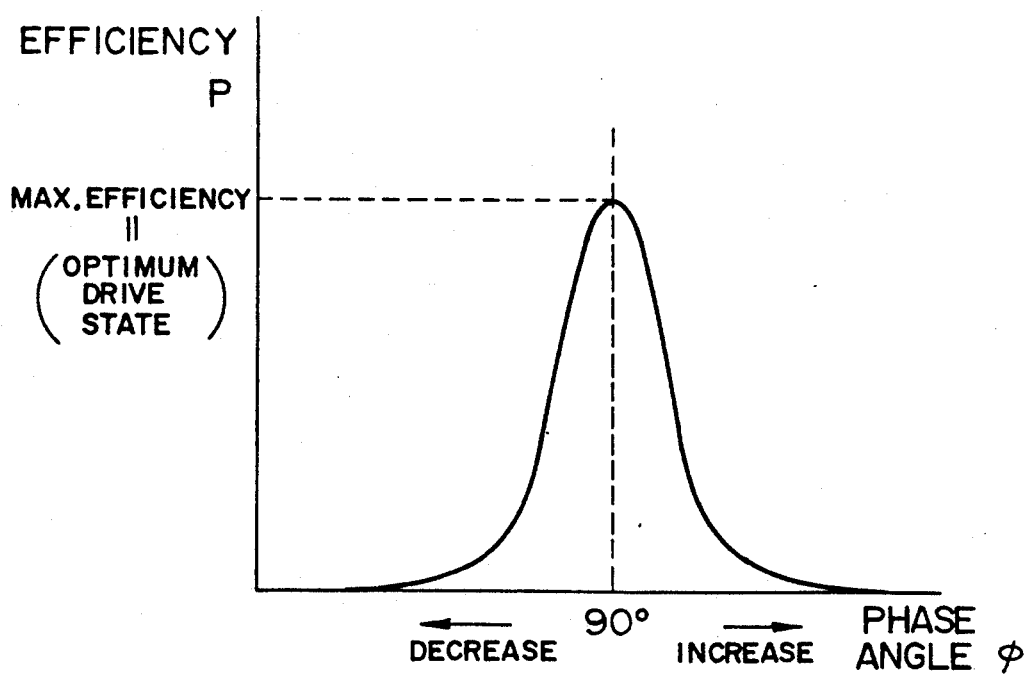
FIG. 3(B) is a graph illustrating the relationship between the phase difference and the driving efficiency P of the motor.

FIGS. 3(A) and 3(B) illustrate this fact.

Referring to FIG. 3(A), there is shown the relationship between the frequency f of the motor drive voltage V1 and the phase angle φ between the longitudinal and torsional vibration signals V3 and V2. As seen from this figure, the characteristic curves of the motor vary, as shown by solid, broken and one-dot-chain lines, as factors such as temperature, load and the like vary.

When the relationship between the phase angle φ and the output efficiency P of the motor is measured for such variable characteristic curves, it has been confirmed that for each of the characteristic curves, the maximum output efficiency of the motor is provided at the phase angle φ equal to 90 degrees, as shown in FIG. 3(B).

In other words, as the operational conditions of the motor vary, the optimum drive frequency also varies correspondingly. However, the phase angle φ remains at 90 degrees as long as the frequency of the motor drive voltage V1 is maintained at the optimum drive frequency.

Thus, if the frequency of the motor drive voltage V1 is controlled so that the phase angle φ between the detection signals from the longitudinal and torsional vibration sensors 28 and 30 becomes 90 degrees, the Langevin type ultrasonic bolt-tightening motor is always driven with the maximum efficiency.

Figure 4:
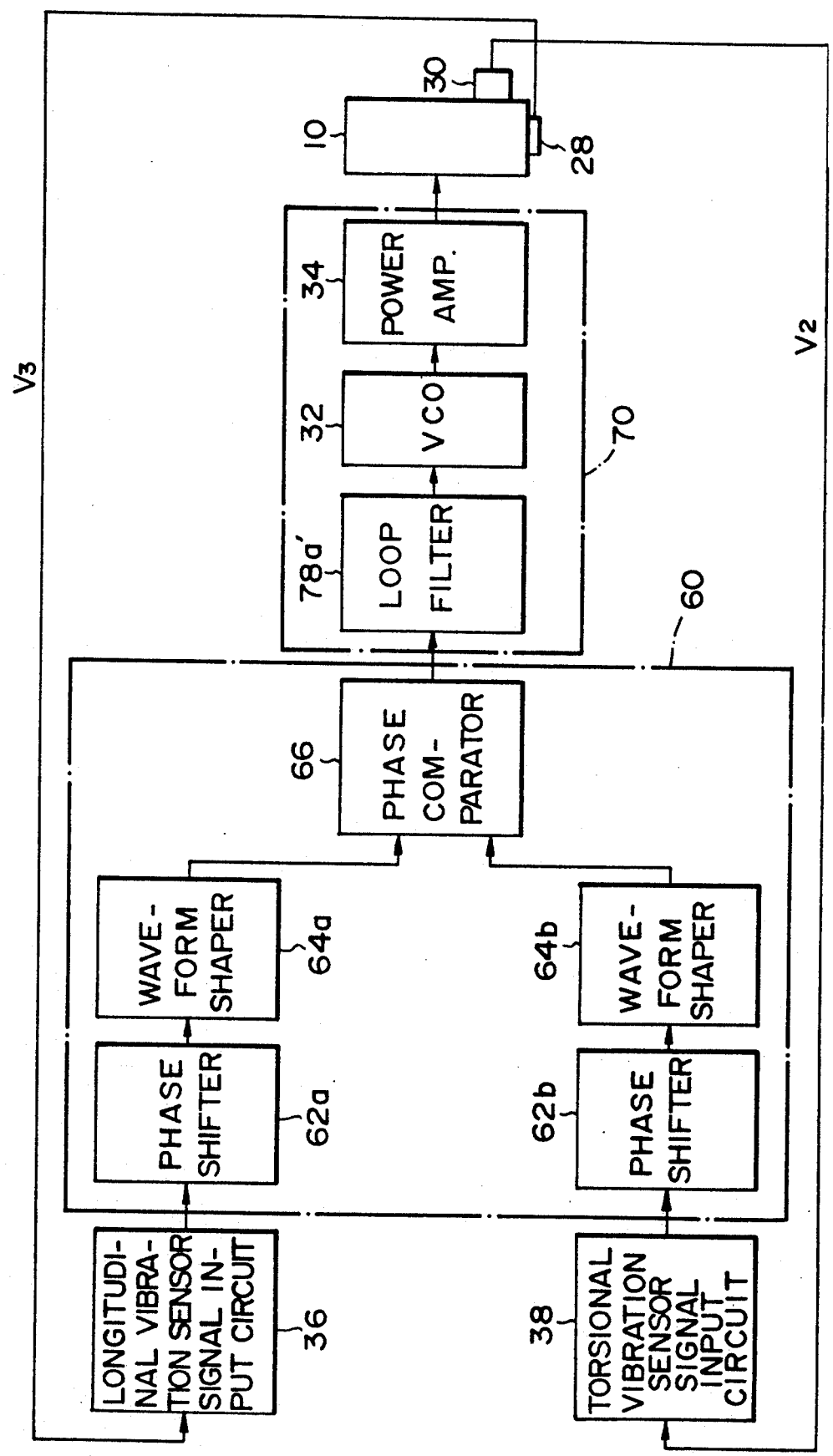
FIG. 4 is a block diagram of a first preferred embodiment of a drive circuit for the Langevin type ultrasonic bolt-tightening motor relating to the present invention.

Referring next to FIG. 4, there is shown a drive circuit for the ultrasonic motor according to the first embodiment. The ultrasonic motor 10 comprises a voltage control oscillator (VCO) 32 which outputs an AC voltage having a predetermined frequency. The AC voltage is then amplified up to a motor drive voltage by a power amplifier 34. The motor drive voltage is applied to the piezo-electric element 18 through terminals T3 and T4 to drive the ultrasonic motor 10.

The drive circuit of the first embodiment comprises a longitudinal vibration sensor signal input circuit 36 for receiving the output V3 of the longitudinal vibration sensor 28 and a torsional vibration sensor signal input circuit 38 for receiving the output V2 of the torsional vibration sensor 30. These input circuits 36 and 38 transform the input signals V3 and V2 respectively into appropriate voltage levels and then output these signals to a phase difference detecting section 60.

The phase difference detecting section 60 comprises phase-shifting circuits 62a and 62b receiving the signals V3 and V2, waveform shaping circuits 64a and 64b receiving the outputs of the phase-shifting circuits 62a and 62b, and a phase comparator 66 for detecting a phase difference between the outputs of the waveform shaping circuits 64a and 64b.

Each of the phase-shifting circuits 62a and 62b is to shift only input signals. In the first embodiment, if the input signals V3 and V2 are in phase, the adjustment of phase is so accomplished that the output of the phase-shifting circuit 62b delays from the output of the phase-shifting circuit 62a by 90 degrees.

Each of the waveform shaping circuits 64a and 64b converts a sinusoidal wave signal from the corresponding phase-shifting circuits 62a and 62b into a square wave sighnal in the same phase, which signal is then outputted therefrom to the phase comparator 66.

In such a manner, the phase comparator 66 detects the phase difference between the two input signals and outputs a positive or negative pulse signal proportional to the detected phase difference to a frequency regulating section 70.

The frequency regulating section 70 comprises a loop filter 78a functioning as a signal converter, the voltage control oscillator (VCO) 32 and the power amplifier 34.

The loop filter 78a is adapted to remove high-frequency and noise components from the pulse signal outputted from the phase comparator 66 to form an integrated output DC voltage. The output voltage of the loop filter 78a is received by the VCO 32.

Thus, the VCO 32 will function to output an AC voltage having a frequency corresponding to the output voltage of the loop filter 78a to the power amplifier 34.

In such an arrangement, the operation is as follows:

When a power switch is first closed, the VCO 32 outputs an AC voltage having its initial frequency fi. The AC voltage is amplified by the power amplifier 34 up to the motor drive voltage V1 required to drive the ultrasonic motor 10, which drive voltage is then applied to the terminals T3 and T4 for driving the ultrasonic motor 10. On application of this voltage, the longitudinal and torsional vibrations are generated in the block members 14 and 16. As a result, the longitudinal vibration sensor 28 produces the longitudinal vibrations signal V3 corresponding to the longitudinal vibration while the torsional vibration sensor 30 produces the torsional vibration signal V2 corresponding to the torsional vibration.

The longitudinal vibration signal V3 is supplied to the longitudinal vibration sensor input circuit 36 wherein this signal is lowered to a voltage level suitable for control. On the other hand, the torsional vibration signal V2 is supplied to the torsional vibration sensor signal input circuit 38 wherein the torsional vibration signal is reduced to a voltage level suitable for control.

When the longitudinal and torsional vibration signals V3 and V2 are respectively inputted from the sensor signal input circuits 36 and 38 to the phase-shifting circuits 62a and 62b, the phases of these input signals are changed and regulated by the phase-shifting circuits 62a and 62b, respectively. If the input signals V3 and V2 are in phase, the regulation is carried out so that the output of the phase-shifting circuit 62b is shifted from that of the phase-shifting circuit 62a by 90 degrees at all times, even if there is any change in frequency. If the control is performed so that the output signals of the phase-shifting circuits 62a and 62b becomes in-phase, the phase difference between the signals V3 and V2 can be 90 degrees. The outputs of the phase-shifting circuits 62a and 62b are waveform shaped to square wave signals by the waveform shaping circuits 64a and 64b respectively, as shown in FIGS. 5(A) and 5(B). These square wave signals are then inputted to the phase comparator 66.

Part Z1 in FIG. 5 indicates a phase delay of the output signal of the waveform shaping circuit 64a relative to the output signal of the waveform shaping circuit 64b. In such a situation, the present frequency of the motor drive voltage is not the optimum drive frequency and the phase angle φ becomes larger than 90 degrees.

At this time, as shown in FIG. 5(C), the phase comparator 66 outputs a negative pulse signal about a reference high impedance in the form of a pulse having its pulse width corresponding to Z1 which is a phase difference between the reference high impedance and the negative pulse signal. Similarly, part Z2 is a phase delay from the output of the waveform shaping circuit 62b. Thus, the phase comparator 66 outputs a negative pulse signal having a pulse width corresponding to this delay.

In part Z3 of FIG. 5(B), the output signals of the waveform shaping circuits 64a and 64b are in phase. In this case, the phase difference between the input signals V3 and V2 of the phase-shifting circuits 62a and 62b is 90 degrees, as described. Thus, the frequency of the motor drive voltage will be the optimum drive frequency fM in the state Z3. Under such a condition, the output of the phase comparator 66 is maintained at high-impedance and no pulse signal is outputted therefrom.

Parts Z4 and Z5 of FIG. 5(B) indicate that there is a phase delay in the output signal of the waveform shaping circuit 64a. In such a case, the phase comparator 66 outputs a positive pulse signal having its pulse width which corresponds to the delay width.

The loop filter 78a is responsive to the positive or negative pulse signal, or the high-impedance signal from the phase comparator 66, and outputs a given analog voltage signal.

FIG. 5(D) shows the output signal of the loop filter 78a, which signal varies as follows:

If the aforementioned phase angle $\phi$ is larger than 90 degrees, the frequency of the motor drive voltage must be increased. On the contrary, if the phase angle $\phi$ is smaller than 90 degrees, the frequency of the motor drive voltage should be decreased.

For such a reason, the phase comparator 66 outputs a negative pulse if the phase angle $\phi$ is larger than 90 degrees, as in the parts Z1 and Z2 in FIG. 5. Thus, the DC voltage in the loop filter 78a will be lowered while the oscillation frequency of the VCO 32 will be increased. If the phase angle $\phi$ becomes equal to 90 degrees by the increase of the oscillation frequency, the output voltage of the phase comparator 66 is maintained constant as in the part Z3 while the oscillation frequency of the VCO 32 is also maintained constant. If the phase angle $\phi$ becomes smaller than 90 degrees as in the parts Z4 and Z5, the phase comparator 66 will output a positive pulse signal which in turn serves to increase the DC voltage of the loop filter 78a and to decrease the oscillation frequency of the VCO 32.

In such a manner, the VCO 32 functions to increase the oscillation frequency when the output voltage of the loop filter 78a decreases and to decrease the oscillation frequency if the output voltage of the loop filter 78a increases. Thus, the frequency of the motor drive voltage will be increased if the phase angle $\phi$ becomes larger than 90 degrees and decreased if the phase angle $\phi$ becomes smaller than 90 degrees.

FIGS. 6(A), 6(B) and 6(C) illustrate a state in which the frequency of the motor drive voltage has been controlled in the aforementioned manner. That is, waveforms are output at various circuit parts when the motor is operating with the voltage at the optimum drive frequency to maintain the phase angle $\phi$ between the longitudinal and torsional vibration sensor signals, V3 and V2, at 90 degrees.

FIG. 6(A) indicates the actually applied motor drive voltage signal V1 and the longitudinal and torsional vibration signals W3 and V2 generated by application of the motor drive voltage. Since the present drive voltage is in the optimum drive frequency, the phase angle $\phi$ between the signals V3 and V2 is maintained at has been regulated to 90 degrees.

FIG. 6(B) shows signal waveforms outputted, at this time, from the longitudinal and torsional vibration sensor signal input circuits 36 and 38. Each of the signal waveforms is regulated to a voltage level suitable for control. The phase angle $\phi$ becomes equal to 90 degrees.

FIG. 6(C) illustrates signal waveforms outputted from the waveform shaping circuits 64a and 64b at this time. These waveforms are completely in phase. This enables the phase difference between the input signals V3 and V2 of the waveform shaping circuits 62a and 62b to be controlled to be maintained at 90 degrees.

In such a manner, the first embodiment can feedback control the frequency of the motor drive voltage V1 to maintain the phase difference between the signals V3 and V2 at 90 degrees. Such a control can regulate the frequency of the motor drive voltage at all times such that the frequency follows the optimum drive frequency despite varying due to changes in factors such as temperature, load and the like. Consequently, the Langevin type ultrasonic bolt-tightening motor can be driven efficiently.

It is to be understood that the present invention is not limited to the first embodiment and may be applied to many modifications within the scope of the present invention.

For example, the analog drive circuit for the ultrasonic motor 10 may be replaced by any digital drive circuit, if required. The control may be carried out by a computer.

Although the first embodiment has been described as to controlling the phase difference between two signals V3 and V2 so as to maintain a 90 degree phase difference by the use of the phase-shifting circuits 62a and 62b, the phase-shifting circuits 62a and 62b may be omitted, if required. In such a case, the phases of the signals V3 and V2 may be compared with each other directly by the phase comparator 66 so that the phase difference therebetween will be controlled to be equal to 90 degrees.

Second Embodiment

In the first embodiment, the frequency of the motor drive voltage V1 can be satisfactorily controlled only when the amplitudes of the signals from the vibration sensors 28 and 30 are in a relatively large active area. The frequency of the motor drive voltage cannot be controlled when the amplitudes of the signals of the vibration sensors 28 and 30 are in the dead area wherein they are remarkably decreased or unstable.

For example, if the frequency of the motor drive voltage can be set at or near the optimum drive frequency on initiation of the motor as shown in FIGS. 7(A) and 7(B), the longitudinal and torsional vibrations can be generated with sufficient magnitude. Thus, the amplitudes of the signals V2 and V3 from the vibration sensors 28 and 30 can be sufficiently large. In such a situation, the phase difference $\phi$ between the longitudinal and torsional vibration signals V3 and V2 can be specified, so that, based on the specified phase difference $\phi$, the frequency of the motor drive voltage V1 can be set to the optimum drive frequency to start the motor.

If the frequency of the motor drive voltage V1 used when starting the motor is set at a level greater than the optimum drive frequency, the longitudinal and torsional vibrations generated in the stator section 11 are remarkably reduced. As shown in FIG. 7(C), the output signals of the vibration sensors 28 and 30 also are greatly reduced in amplitude and contain noises, leading to very unstable state of the motor. In such a situation, the phase difference between the longitudinal and torsional vibrations becomes ambiguous. Therefore, the frequency of the motor drive voltage V1 cannot be controlled to be set to the optimum drive frequency. As a result, the start of the motor becomes impossible.

If the frequency of the motor drive voltage V1 is set at a frequency which generates any vibration other than the longitudinal and torsional vibrations, such as flexural vibration or the like, the longitudinal and torsional vibration sensors 28 and 30 may generate abnormal signals having their frequencies different from the frequency of the motor drive voltage V1, as shown in FIG. 7(D). In such a condition, the phase difference between the longitudinal and torsional vibrations cannot be accurately determined. Thus, the frequency of the motor drive voltage V1 cannot be set to the optimum drive frequency. This makes the start of the motor impossible.

Another feature of the present invention is that it is judged whether the output signals of the vibration sensors 28 and 30 are in such an active area as shown in FIGS. 7(A) and 7(B) or in such a dead area as shown in FIGS. 7(C) and 7(D). If it is judged that these output signals are in the dead area, the frequency of the motor drive voltage V1 is regulated such that the outputs of the vibration sensors 28 and 30 move to the active area. Thereafter, the frequency will be regulated based on the phase angle $\phi$. The frequency of the motor drive voltage can be automatically controlled to be set to the optimum drive frequency. Thus, the motor can be started reliably.

Figures 8, 8A:
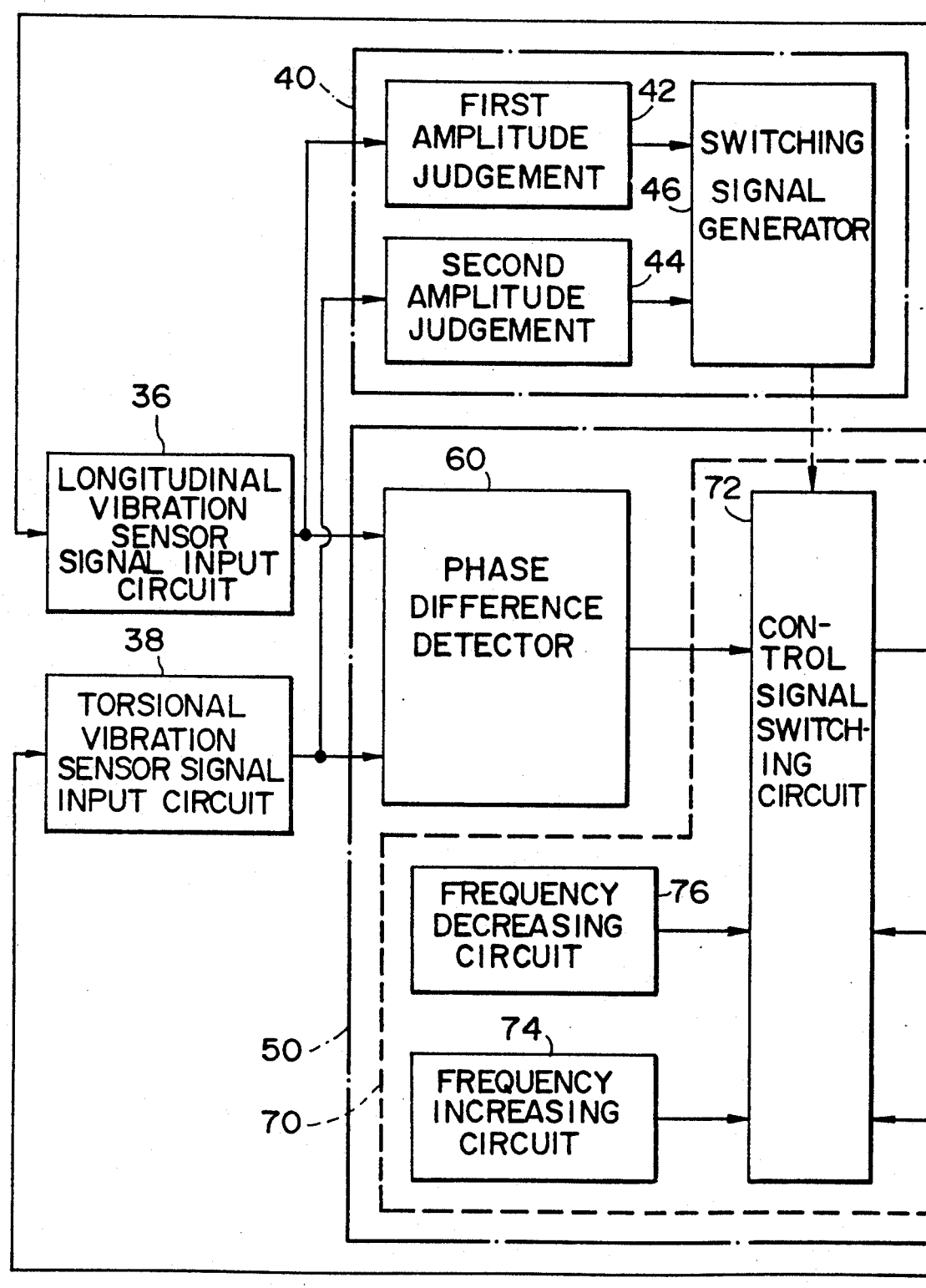
FIGS. 8, 8A and 8B are block circuit diagrams of a second preferred embodiment of the drive circuit for the Langevin type ultrasonic bolt-tightening motor which is constructed in accordance with the present invention.
Figure 8B:
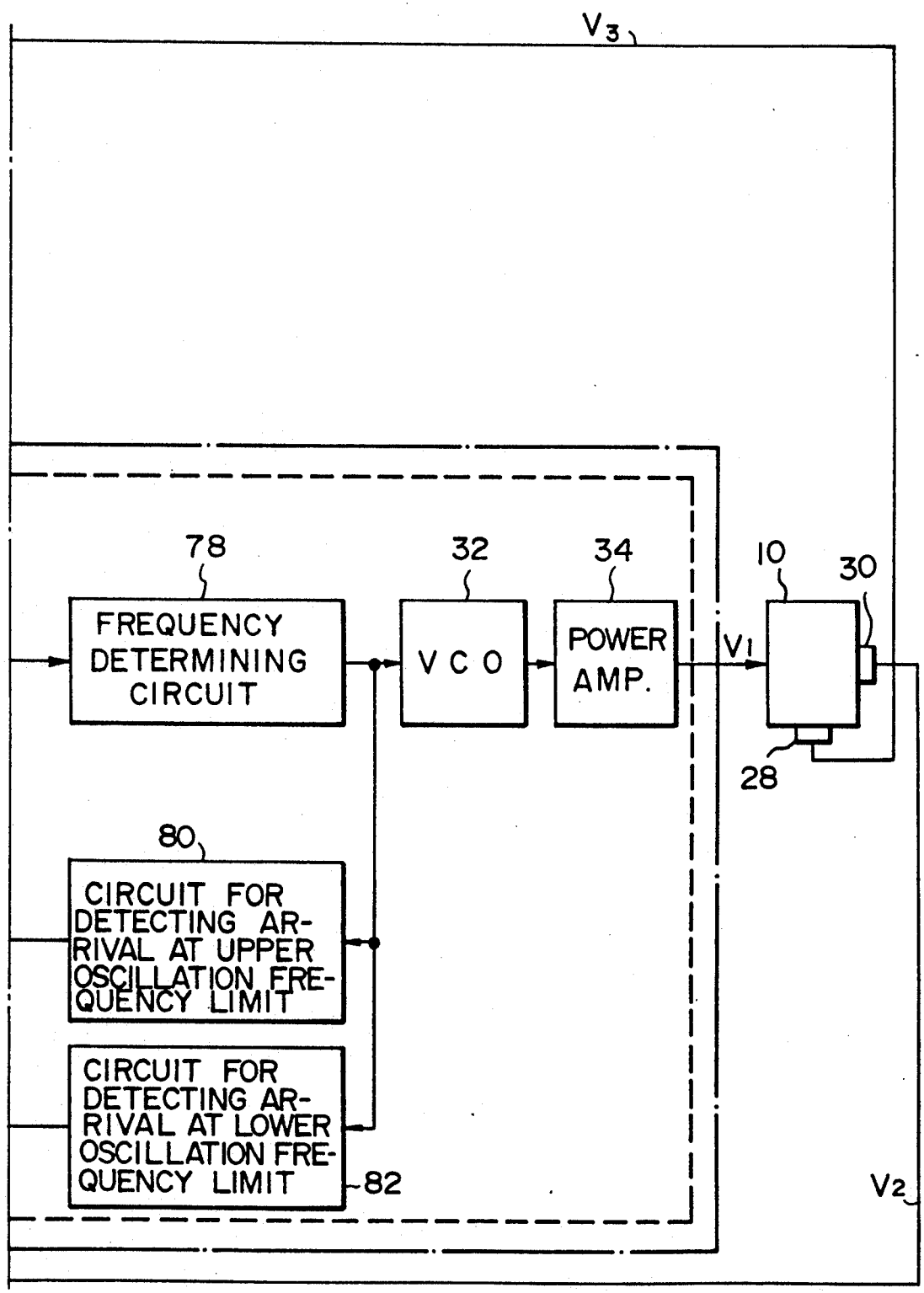

FIG. 8 shows the ultrasonic motor drive circuit constructed according to the second embodiment, in which parts similar to those of the first embodiment are denoted by similar reference numerals and will not be described further.

The drive circuit of the second embodiment comprises a voltage control oscillator (VCO) 32 which outputs an AC voltage having a predetermined frequency. The AC voltage is amplified by a power amplifier 34 up to a motor drive voltage which is in turn applied to a piezo-electric element 18 through terminals T3 and T4 to drive the ultrasonic motor 10.

The drive circuit also includes a longitudinal vibration sensor input circuit 36 receiving the output signal V3 of the longitudinal vibration sensor 28 and a torsional vibration sensor signal input circuit 38 receiving the output signal V2 of the torsional vibration sensor 30. Each of the input circuits 36 and 38 is adapted to transform the input signal V3 or V2 into an appropriate voltage level. The transformed signal is then inputted to a sensor output discriminating section 40 and a frequency controlling section 50.

The sensor output discriminating section 40 is adapted to judge that the output signals from the respective vibration sensors 28 and 30 through the input circuits 36 and 38 are in the active area when they are respectively above a predetermined level after noise and abnormal signal components have been removed therefrom. If the output signals are not above the predetermined level, the sensor output discriminating section 40 judges that the sensor outputs are in the dead area.

The sensor output discriminating section 40 comprises a first amplitude discriminating section 42, a second amplitude discriminating section 44 and a switching signal generating section 46. If the output signal V3 of the longitudinal vibration sensor 28 inputted to the first amplitude discriminating section 42 through the input circuit 36 is above a preselected reference level after noise and abnormal signal components have been removed therefrom, the first amplitude discriminating section 42 judges that the sensor output is in the active area and outputs a signal of high-level to the switching signal generator 46. Similarly, if the output signal V2 of the torsional vibration sensor 30 inputted to the second amplitude discriminating section 44 through the input circuit 38 is above a preselected reference level after noise and abnormal signal components have been removed therefrom, the second amplitude discriminating section 44 judges that the sensor output is in the active area and outputs a signal of high-level to the switching signal generator 46.

Only when both the first and second amplitude discriminating sections 42 and 44 outputs the high-level signals, the switching signal generator 46 judges that both the output signals of the vibration sensors 28 and 30 are in the active area and outputs a signal of high-level. If both of the output signals are not in the active area, the switching signal generator 46 outputs a signal of low-level.

The drive circuit of the second embodiment comprises a frequency control section 50 which is responsive to the output signals of the vibration sensors 28 and 30 inputted thereto through the input circuits 36 and 38 and the switching signal outputted from the switching signal generator 46 to control the frequency of the motor drive voltage outputted from the oscillator 32.

The frequency control section 50 is adapted to control the frequency of the motor drive voltage such that the output signals of the vibration sensors 28 and 30 will be moved to the active area when the low-level signal is inputted from the switching signal generator 46, that is, when it is judged that the outputs of the vibration sensors 28 and 30 are in the dead area. When the high-level signal is inputted to the frequency control section 50 from the switching signal generator 46, that is, when it is judged that the outputs of the vibration sensors 28 and 30 are in the active area, the frequency control section 50 is responsive to control the output signals of the vibration sensors 28 and 30 to the frequency of the motor drive voltage so as to maintain the frequency at the optimum drive frequency.

In the second embodiment, the frequency control section 50 comprises a phase difference detecting section 60 and a frequency regulating section 70.

The phase difference detecting section 60 is adapted to compare phases of the output signals V3 and V2 of the longitudinal and torsional vibration sensors 28 and 30 to determine a phase difference $\phi$ therebetween. The phase difference detecting section 60 then outputs, to the frequency regulating section 70, a control signal which makes this phase difference $\phi$ equal to 90 degrees.

The frequency regulating section 70 comprises a control signal switching circuit 72, a frequency increasing circuit 74, a frequency decreasing circuit 76, a frequency determining circuit 78, a circuit 80 for detecting arrival at an upper-limit oscillation frequency, a circuit 82 for detecting arrival at a lower-limit oscillation frequency and a power amplifier 34 contained in said VCO 32.

The frequency increasing circuit 74 outputs a control signal for increasing the oscillation frequency while the frequency decreasing circuit 76 outputs a control signal for decreasing the oscillation frequency.

The control signal switching circuit 72 outputs a frequency control signal which is the output of the phase difference detector 60 to the frequency determining circuit 78 when a high-level signal is outputted from the switching signal generator 46. When a low-level signal is outputted from the switching signal generator 46, the control signal switching circuit 72 is responsive to the outputs of the detecting circuits 80 and 82 to output any one of the outputs of the frequency increasing and decreasing circuits 74 and 76 to the frequency determining circuit 78 as a frequency control signal.

The frequency determining circuit 78 is responsive to the inputted frequency control signal to control the oscillation frequency of the VCO 32. More particularly, when the frequency determining circuit 78 receives the control signal from the phase difference detector 60, the circuit 78 controls the oscillation frequency of the VCO 32 such that the phase difference between the signals of the vibration sensors 28 and 30 will be equal to 90 degrees. When the frequency determining circuit 78 receives the control signals from the frequency increasing and decreasing circuits 74 and 76, the circuit 78 controls to increase or decrease the oscillation frequency of the VCO 32.

The circuit 80 for detecting arrival at the upper-limit oscillation frequency is responsive to the output of the frequency determining circuit 78 to detect whether or not the oscillation frequency of the VCO 32 arrives at its predetermined upper limit. If so, the circuit 80 outputs a detection signal to the control signal switching circuit 72. Similarly, the circuit 82 for detecting arrival at the lower-limit oscillation frequency is adapted to judge whether or not the oscillation output of the VCO 32 arrives at its predetermined lower limit. If so, the circuit 82 outputs a detection signal to the control signal switching circuit 72.

The frequency regulating section 70 will operates as follows:

FIG. 10(A) shows the relationship between the phase difference $\phi$ of the output signals from the vibration sensors 28 and 30 and the frequency f of the motor drive voltage V1; FIG. 10(B) shows the relationship between the output signal amplitude of the torsional vibration sensor 30 and the frequency f of the motor drive voltage V1; FIG. 10(C) shows the relationship between the output signal amplitude of the longitudinal vibration sensor 28 and the frequency f of the motor drive voltage V1; FIG. 10(B') shows the relationship between the amplitude of the output signal of the torsional vibration sensor 30 after noise and abnormal signal components have been removed therefrom and the frequency f of the motor drive voltage V1; and FIG. 10(C') shows the relationship between the amplitude of the output signal of the longitudinal vibration sensor 28 after noise and abnormal signal components have been removed therefrom and the frequency f of the motor drive voltage V1. These characteristic curves vary, as shown by solid, broken and one-dot-chain lines, depending on changes in various factors such as temperature, load and the like.

If the output signal amplitudes of the torsional and longitudinal vibration sensors 30 and 28 are above the respective reference levels VS1 and VS2 after noise and abnormal signal components have been removed therefrom, the sensor output discriminating section 40 provides a high-level signal indicative of sensor outputs in the active area to the control signal switching circuit 72. If not the sensor output discriminating section 40 provides, to the control signal switching circuit 72, a low-level signal indicative of sensor outputs in the dead area.

The circuits 80 and 82 for detecting arrival at the upper- and lower-limit oscillation frequencies set upper- and lower-limit frequencies fU and fD in the dead area. These upper- and lower-limit frequencies fU and fD are preferably established within a range of frequency in which they will not be in the active area even if the characteristic curves vary due to changes in temperature, load and the like.

When the power is turned due to and if a low-level signal indicative of the sensor outputs in the dead area is inputted from the switching signal generator 46 to the control signal switching circuit 72, the latter first causes the frequency increasing circuit 74 to provide its output to the frequency determining circuit 78 such that the oscillation frequency of the VCO 32 increases toward the upper-limit frequency fU. If the sensor outputs come into the active area during the increase of the frequency, the output of the switching signal generator 46 changes from low-level to high-level. This causes the control signal switching circuit 72 to provide the output of the phase difference detecting section 60 to the frequency determining circuit 78 which in turn controls the oscillation frequency of the VCO 32 such that the phase difference $\phi$ between the sensor outputs becomes equal to 90 degrees. Thus, the frequency of the motor drive voltage will be maintained at the optimum drive frequency.

If the switching signal generator 46 does not output a high-level signal when the oscillation frequency of the VCO 32 is increased up to the upper-limit frequency fU, the control signal switching circuit 72 then causes the frequency decreasing circuit 76 to provide its output, as a control signal, to the frequency determining circuit 78. This causes the oscillation frequency of the VCO 32 to decrease from the upper-limit frequency fU to the lower-limit frequency fD. If the output of the switching signal generator 46 changes from low-level to high-level during the decrease of frequency, the control signal switching circuit 72 will cause the phase difference detecting circuit 60 to provide its output to the frequency determining circuit 78 as a control signal.

If the output of the switching signal generator 46 does not reach the high-level even during the decrease of frequency for any reason, the increasing of the oscillation frequency to the upper-limit frequency fU is repeated as the oscillation frequency arrives at the lower-limit frequency fD.

In such a manner, when the outputs of the vibration sensors 28 and 30 are in the dead area wherein they are uncontrollable, the drive circuit of the second embodiment causes the sensor outputs to move into the active area by repeating the increasing and decreasing of the frequency of the VCO 32 to the upper- and lower-limit frequencies fU and fD.

For example, even if the frequency of the motor drive voltage V1 is in the dead area on start of the motor, it can be automatically moved into the active area. Therefore, the motor can be started reliably.

It is obvious that when the frequency of the motor drive voltage V1 is in the active area, the motor can be started without any obstruction.

Figures 9, 9A:
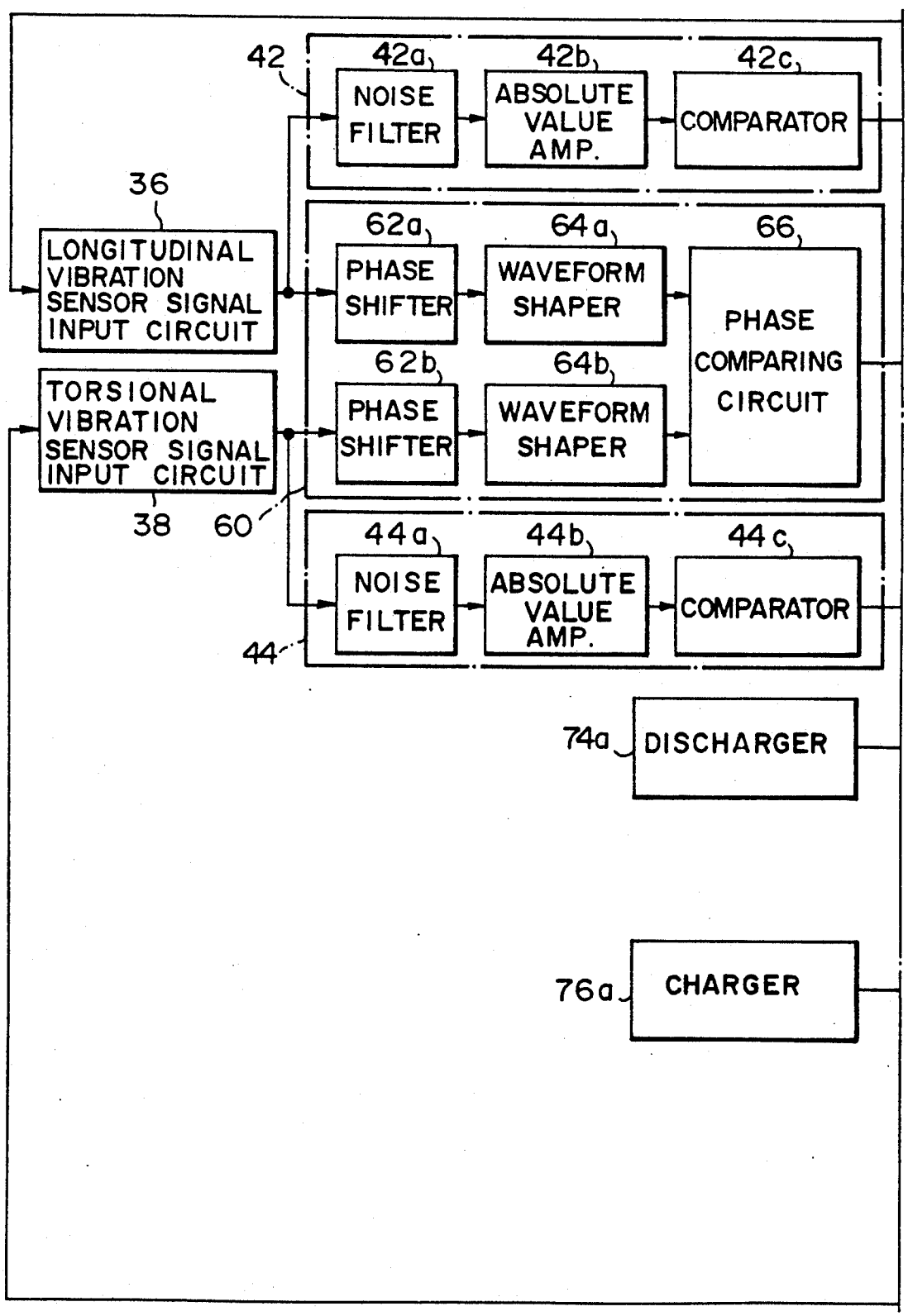
FIGS. 9, 9A and 9B illustrate the detailed arrangement of the drive circuit shown in FIG. 8.
Figure 9B:
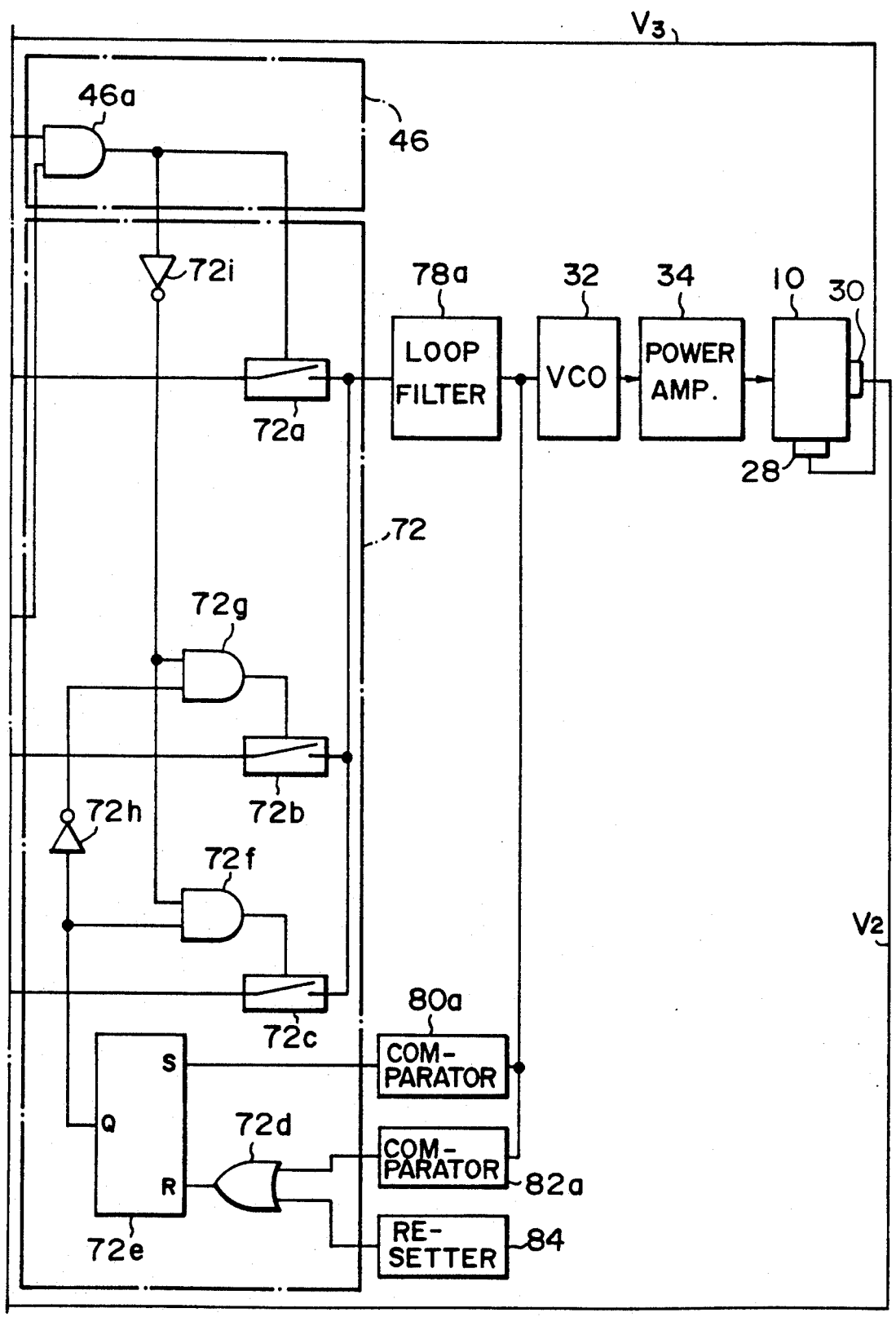

FIG. 9 shows the detailed arrangement of the motor drive circuit shown in FIG. 8.

First of all, the arrangement of the sensor output discriminating section 40 will be described in detail.

The switching signal generator 46 comprises an AND gate 46a.

The first amplitude discriminating section 42 comprises a noise filter 42a, an absolute value amplifying circuit 42b and a comparator 42c. The second amplitude discriminating section 44 similarly comprises a noise filter 44a, an absolute value amplifying circuit 44b and a comparator 44c.

Each of the noise filters 42a or 44a removes noise and abnormal signal components from the sensor outputs inputted thereto through the input circuit 36 or 38 and also functions to output only amplitudes affected by the longitudinal and torsional vibrations detected by the respective sensors to the absolute value detecting circuit 42b or 44b.

Each of the absolute value detecting circuits 42b or 44b is adapted to output an AC voltage signal corresponding to the amplitude of the sensor output inputted thereto to the associated comparator 42c or 44c.

Each of the comparators 42c and 44c includes a predetermined reference level VS2 and VS1. If each of the input signals exceeds the corresponding reference level, the comparator 42c or 44c outputs a high-level signal to the AND gate 46a.

Only when both the amplitudes affected by the longitudinal and torsional vibrations are above the reference levels, is it judged that the sensor outputs are in the active area. Thus, the AND gate 46a outputs a high-level signal. If the amplitudes are not above the reference levels it is judged that the sensor outputs area in the dead area. The AND gate 46 outputs a low-level signal.

FIG. 11 is a timing chart illustrating the operation of the sensor output discriminating section 40, in which the horizontal axis represents the oscillation frequency f of the VCO 32.

When the torsional vibration sensor signal input circuit 38 outputs a torsional vibration signal V2, its amplitude is as shown in FIG. 11(B). After noise and abnormal signal components have been removed by the noise filter 44a, the output signal V2 is then amplified in absolute value by the absolute value amplifying circuit 44b and supplied to the comparator 44c as a DC signal as shown in FIG. 11(C).

The comparator 44c compares such a DC signal with the reference level VS1. If the input signal is above the reference level, the comparator 44c judges that the input signal is a controllable sensor output and outputs a high-level signal as shown in FIG. 11(D) to the AND gate 46a.

When the longitudinal vibration sensor signal input circuit 36 outputs a longitudinal vibration signal V3, its amplitude is as shown in FIG. 11(E). After noise and abnormal signal components have been removed by the noise filter 42a, the output signal V3 is then amplified in absolute value by the absolute value amplifying circuit 42b and supplied to the comparator 42c as a DC signal as shown in FIG. 11(F).

The comparator 42c compares such a DC signal with the reference level VS2. If the input signal is above the reference level, the comparator 42c outputs a high-level signal as shown in FIG. 11(G) to the AND gate 46a.

Only when both the amplitudes of the longitudinal and torsional vibrations V3 and V2 from the longitudinal and torsional vibration sensors 30 and 28 are above the respective reference levels does, the AND gate 46a judges that the sensor outputs are in the active area and then output a high-level signal as shown in FIG. 11(H).

The phase difference detecting section 60 will be described in detail below.

The phase difference detecting section 60 comprises a pair of phase-shifting circuits 62a and 62b, a pair of waveform shaping circuits 64a and 64b, and a phase comparator 66, as in the first embodiment.

The phase-shifting circuits 62a and 62b perform the conversion of only the input signal phases. In the second embodiment, the regulation of phase is such that the output of the input signal V2 delays from the input signal V3 by 90 degrees. For example, if the input signals V3 and V2 are in phase, the output of the phase-shifting circuit 62b will be delayed from that of the phase-shifting circuit 62a by 90 degrees.

The outputs of the phase-shifting circuits 62a and 62b are inputted to the respective waveform shaping circuits 64a and 64b. After being inputted, the sinusoidal wave signals are converted into square wave signals in phase, which in turn are inputted to the phase comparator 66.

The phase comparator 66 detects a phase difference between the two inputted signals and outputs a positive or negative pulse signal corresponding the detected phase difference through an analog switch 72a to a loop filter 78a which functions as a frequency determining circuit 78.

The loop filter 78a functions to remove noise and high-frequency signal components from the pulse signals so inputted and integrates these pulse signals to form an output DC voltage which is in turn inputted to the VCO 32. Therefore, the VCO 32 will output an AC voltage having a frequency corresponding to the output voltage from the loop filter 78a to the power amplifier 34. Waveforms representative of a series of operations in the phase difference detecting section 60, loop filter 78a and VCO 32 are shown in FIGS. 5 and 6. Since these operations are similar to those of the first embodiment, they will not described further.

Each of the circuits 80 and 82 for detecting arrival at the upper- and lower-limit oscillation frequencies includes a comparator 80a or 82a.

Each of the frequency increasing and decreasing circuits 74 or 76 includes a discharger 74a and a charger 76a.

The discharger 74a outputs a high-level signal or a high-level pulse signal under its high impedance state. The output signal is then inputted to the loop filter 78a through an analog switch 72b. When the loop filter 78a receives the signal from the discharger 74a, the loop filter 78a functions to decrease a voltage to be applied to the VCO 32. Thus, the oscillation frequency of the VCO 32 will increase.

The charger 76a outputs a low-level signal or a low-level pulse signal under its high impedance state. The output signal is then inputted to the loop filter 78a through an analog switch 72c. When the loop filter 78a receives the signal from the charger 76a, the loop filter 78a increases a voltage to be applied to the VCO 32. Thus, the oscillation frequency of the VCO 32 will decrease.

The control signal switching circuit 72 comprises the above three analog switches 72a, 72b and 72c, an OR gate 72d, an RS latch circuit 72e, inverters 72h and 72i, and AND gates 72g and 72f. Each of the three analog switches 72a, 72b or 72c can be turned on only when it receives a high-level signal from the corresponding one of the AND gates 46a, 72g or 72f.

More particularly, the control signal switching circuit 72 is such that when a power switch (not shown) is closed, one high-level pulse signal is first inputted from a reset circuit 84 through the OR gate 72 to the reset terminal of the RS latch circuit 72e. As a result, the output Q of the latch circuit 72e will be initially set at low-level.

When a high-level signal representative of the sensor outputs in the active area is outputted from the AND gate 46a, only the analog switch 72a is turned on and the other analog switches 72b and 72c are in their OFF state. Thus, the control signal will be inputted to the loop filter 78a from the phase comparator 66.

As a low-level signal indicative of the sensor outputs in the dead area is outputted from the AND gate 46a, the analog switch 72a is turned off. At the same time, a high-level signal is inputted from the inverter 72i to the AND gates 72g and 72f. Since the output Q of the RS latch circuit 72e is in its initial setting state, the output of the AND gate 72f becomes low-level while the output of the AND gate 72g becomes high-level. If the sensor outputs are in the dead area on start of the motor, the output of the discharger 74a is inputted to the loop filter 78a as a control signal to increase the frequency of the motor drive voltage V1. At this time, the frequency of the motor drive voltage V1 is detected by the comparators 80a and 82a, based on the output voltage of the loop filter 78a. At the same time that the frequency f of the motor drive voltage V1 reaches the upper-limit frequency fU, the comparator 80a outputs a high-level signal to the input terminal S of the RS latch circuit 72e. The output Q of the latch circuit 72e is inverted from low-level to high-level to turn the analog switch 72b off and to turn the analog switch 72c on. As a result, the loop filter 78a receives the output of the charger 76a as a control signal to decrease the frequency of the motor drive voltage V1. As the frequency of the motor drive voltage V1 arrives at the lower-limit frequency fD, the comparator 82a provides a high-level signal to the reset terminal R of the RS latch circuit 72e through the OR gate 72d. As a result, the output Q of the latch circuit 72e is inverted from high-level to low-level to turn the analog switch 72b on and to switch the analog switch 72c off.

The drive circuit causes the reciprocal movement of the frequency f of the motor drive voltage V1 between the upper-and lower-limits fU and fD to control this frequency so that the sensor outputs move into the active area.

On operation, the power switch is first turned on. The latch circuit 72e is reset with its output Q being initially set at low-level. Following the resetting, the VCO 32 outputs an AC voltage having an initial frequency f1. The AC voltage is amplified by the power amplifier 34 to form a motor drive voltage V1 required to drive the ultrasonic motor 10, which voltage V1 is then applied to the terminals T3 and T4 leading to the ultrasonic motor 10.

If the frequency of this motor drive voltage V1 is near the optimum drive frequency, longitudinal and torsional vibrations are generated in the block members 14 and 16. Then, the longitudinal vibration sensor 28 generates a longitudinal vibration signal V3 corresponding to the longitudinal vibration while the torsional vibration sensor 30 generates a torsional vibration signal V2 corresponding to the torsional vibration. On the contrary, if the frequency of the motor drive voltage V1 is farther from the optimum drive frequency, the vibration sensors 28 and 30 output only detection signals having reduced amplitudes and may generate noise or abnormal signal components in certain circumferences.

The longitudinal vibration signal V3 is supplied from the longitudinal vibration sensor 28 through the longitudinal vibration sensor signal input circuit 36 to the noise filter 42a and the phase-shifting circuit 62a. On the other hand, the torsional vibration signal V2 is provided to the noise filter 44a and the phase-shifting circuit 62b through the torsional vibration sensor signal input circuit 38. Each of the noise filters 42a or 42b is responsive to the longitudinal or torsional vibration signal to output a signal to the respective one of the absolute value amplifying circuit 42b or 44b which in turn outputs a DC signal corresponding to the amplitude of the signal from the noise filter 42a or 44a.

If the frequency of the motor drive voltage V1 is farther from the optimum drive frequency, the output signals of the absolute value amplifying circuits 42b and 44b will be in the dead area wherein they are below the reference levels. As a result, the AND gate 46a outputs a low-level signal which is used to turn only the analog switch 72b on.

Thus, the output of the discharger 74a is provided, as a control signal, to the loop filter 78a such that the frequency of the motor drive voltage V1 increases to the upper-limit frequency fU. If the active area exists between the initial frequency of the motor drive voltage V1 and the upper-limit frequency fU, the frequency f of the motor drive voltage V1 moves into the active area and at the same time the output of the AND gate 46a changes from low-level to high-level to turn only the analog switch 72a on.

On the contrary, if the active area does not exist between the initial frequency f1 and the upper-limit frequency fU, the output Q of the latch circuit 72e is inverted at the same time as the frequency of the motor drive voltage V1 arrives at the upper-limit frequency fU, so that the analog switch 72c is turned on and the analog switches 72b and 72a are turned off. Thus, the output of the charger 76a is inputted to the loop filter 78a as a control signal to decrease the frequency of the motor drive voltage V1 from the upper-limit frequency fU to the lower-limit frequency fD.

As will be apparent from the foregoing, if it is judged that the sensor outputs are in the dead area when starting the motor, the drive circuit of the second embodiment causes the frequency of the motor drive voltage V1 to reciprocate between the upper-and lower-limit frequencies fU and fD. Thus, the frequency f of the motor drive voltage V1 can be controlled to move the sensor outputs into the active area.

At the same time as the sensor outputs move into the active area, the analog switches 72b and 72c are turned off and the analog switch 72a is turned on, as described. In response to the output of the phase comparator 66, the control of frequency will be started.

The phase comparator 66 then outputs a control signal used to shift the phase difference $\phi$ between the longitudinal vibration signal V3 output from the longitudinal vibration sensor 28 and the torsional vibration signal V2 output from the torsional vibration sensor 30 to a preselected phase difference equal to 90 degrees so as to provide maximum efficiency. The frequency of the motor drive voltage V1 is set according to the optimum drive frequency fM. The motor may thus be started reliably from the dead area.

Once the motor is started, it may be successively driven with the voltage of the optimum drive frequency fM, based on the output signals V3 and V2 of the vibration sensors 28 and 30.

If the sensor outputs move from the active area to the dead area for any reason during operation of the motor, the motor may be stopped. In accordance with the second embodiment, however, the frequency of the motor drive voltage V1 may be automatically moved into the active area. Therefore, the motor can be reliably re-started.

If the frequency of the motor drive voltage V1 is near the optimum drive frequency when starting the motor, the sensor outputs will be in the active area wherein they are above the respective reference levels. In such a case, only the analog switch 72a is turned on and the control of the frequency can be similarly carried out based on the output of the phase comparator 66.

FIGS. 6(A), 6(B) and 6(C) illustrate a state that the frequency of the motor drive voltage has been controlled in the aforementioned manner in which waveforms are output at various circuit parts when the motor is operating with the voltage at the optimum drive frequency so as to maintain the phase angle $\phi$ between the longitudinal and torsional vibration sensor signals V3 and V2 at 90 degrees.

FIGS. 6(A), 6(B) and 6(C) illustrate waveforms at various circuit parts when the frequency of the motor drive voltage is controlled to be maintained at the optimum drive frequency in the active area.

FIG. 6(A) indicates the actually applied motor drive voltage signal V1 and the longitudinal and torsional vibration signals V3 and V2 generated by application of the motor drive voltage. Since the frequency of the drive voltage is the optimum drive frequency fM, the phase angle $\phi$ between the signals V3 and V2 has been maintained at to 90 degrees.

FIG. 6(B) shows signal waveforms outputted, at this time, from the longitudinal and torsional vibration sensor signal input circuits 36 and 38. Each of the signal waveforms is regulated at a voltage level suitable for control. The phase angle $\phi$ becomes equal to 90 degrees.

FIG. 6(C) illustrates signal waveforms outputted from the waveform shaping circuits 64a and 64b at this time. These waveforms are completely in phase. This enables the phase difference between the input signals V3 and V2 of the waveform shaping circuits 62a and 62b to be maintained at 90 degrees.

In such a manner, the drive circuit of this embodiment controls the frequency of the motor drive voltage V1 so that the phase difference between the torsional and longitudinal vibration signals V2 and V3 will be maintained at 90 degrees. Thus, the frequency of the motor drive voltage V1 can be regulated to follow the optimum drive frequency fM at all times, despite the frequency varying due to changes in magnitude of load, type of motor and the like. As a result, the Langevin type ultrasonic bolt-tightening motor can be driven with increased efficiency.

Although the second embodiment of the present invention has been described using the phase-shifting circuits 62a and 62b to provide the phase difference equal to 90 degrees between two signals V3 and V2, the present invention is not limited to such an arrangement. If required, the phase-shifting circuits 62a and 62b may be omitted. In this case, the phase comparator 66 directly compares the signals V3 and V2 to provide the phase angle of 90 degrees therebetween.

Figure 12A:
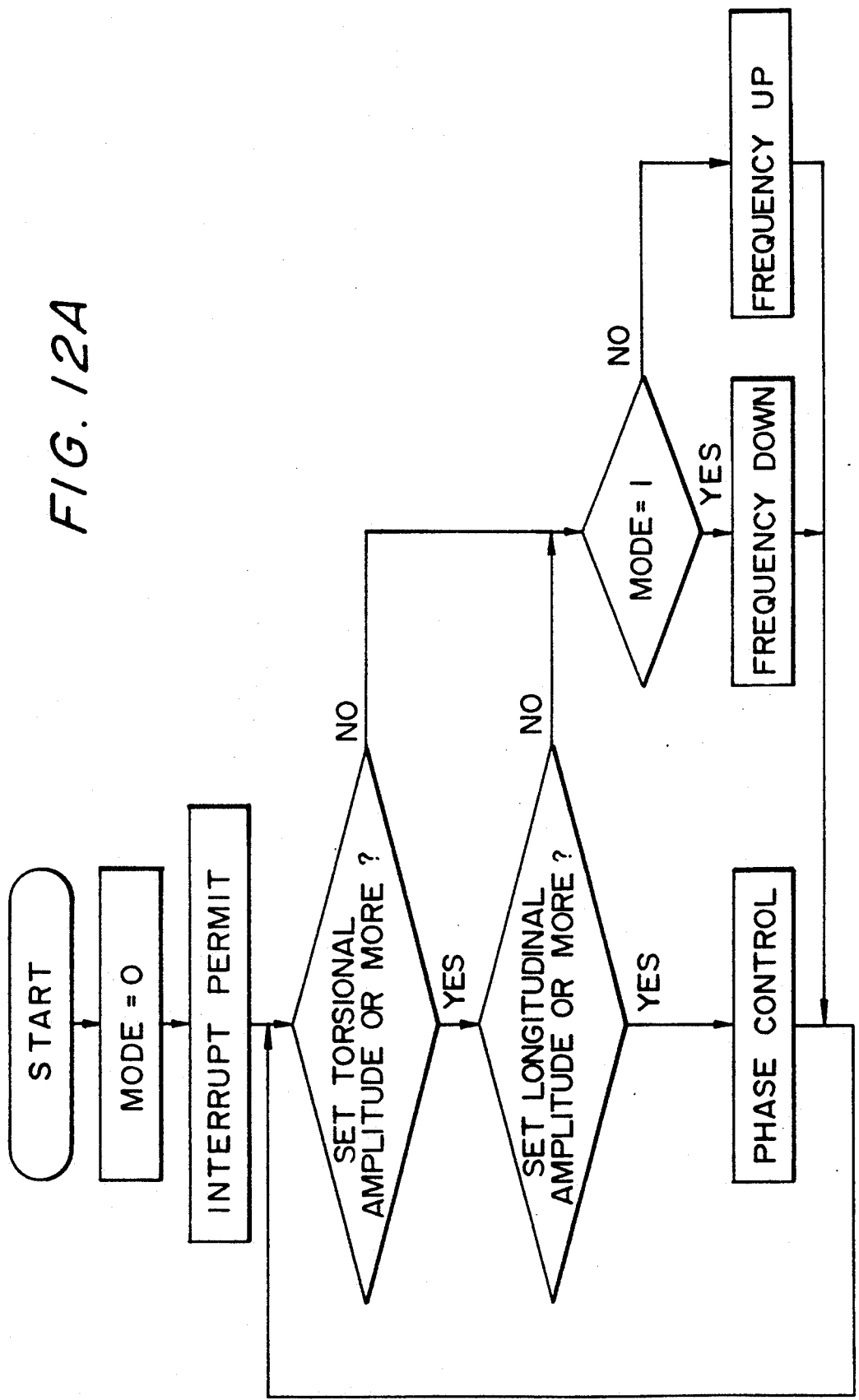
FIG. 12(A) is a flow chart showing the main routine.

Furthermore, the present invention may utilize any suitable computer such as MPU to control the motor in such a manner as shown by a flow chart in FIG. 12.

Although the second embodiment has been described as using a drive circuit which can drive the Langevin type ultrasonic bolt-tightening motor with the maximum efficiency at all times by regulating the frequency of the motor drive voltage such that the phase angle $\phi M$ is always equal to 90 degrees, the actual drive of the motor may be controlled such that the phase angle $\phi M$ is within range of an optimum phase angle of about 90 degrees.

Third Embodiment

Figure 13:
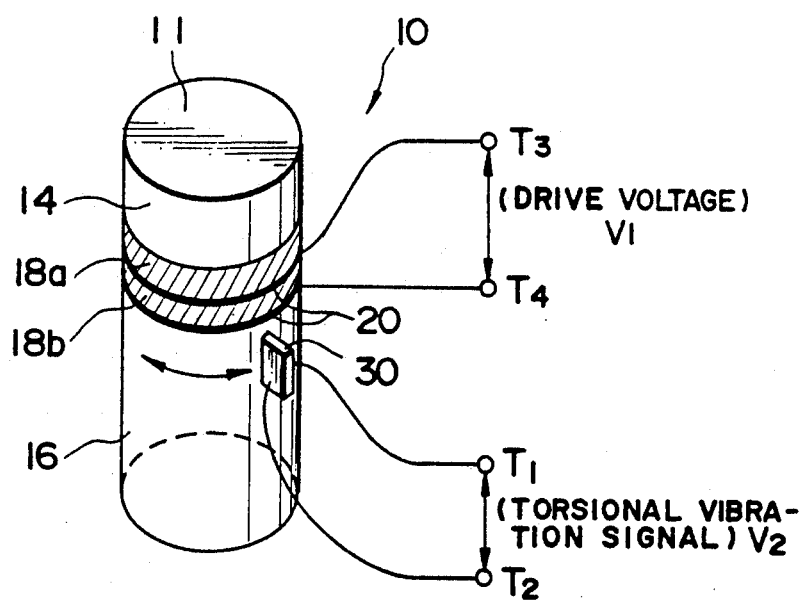
FIG. 13 is a schematically perspective view of the stator section of a third preferred embodiment of a Langevin type ultrasonic bolt-tightening motor constructed in accordance with the present invention.

Referring to FIG. 13, there is shown a third embodiment of a Langevin type ultrasonic bolt-tightening motor constructed in accordance with the present invention, in which parts similar to those of the previously described embodiments are designated by similar reference numerals and will not be described further.

In the third embodiment, a torsional vibration sensor 30 for detecting a torsional vibration as an electrical signal is fixedly mounted on the stator section 11 at one side, as in the first embodiment.

When a predetermined motor drive voltage V1 is applied to the ultrasonic motor through electrodes 20 via terminals T3 and T4, piezo-electric elements 18 generate longitudinal vibrations in the vertical or thickness direction and torsional vibrations shown by arrow in FIG. 13. These vibrations are combined to form an elliptic vibration which appears on the end faces of block members 14 and 16. If a rotor (not shown) is mounted on the upper end of the block member 14, this rotor will be rotationally driven by the elliptic vibration generated on the end face of the block member 14.

In the ultrasonic motor of the third embodiment, the drive circuit detects whether or not the frequency of the motor drive voltage V1 is the optimum drive frequency, indirectly from the phase difference $\phi$ between the torsional vibration signal V2 detected by the torsional vibration sensor 30 and the motor drive voltage V1 applied to the piezo-electric elements 18 through the terminals T3 and T4.

The inventors have found that even if the optimum drive frequency varies, the phase angle $\phi$ between the motor drive voltage V1 and the torsional vibration V2 generated at the stator section 11 is always equal to a fixed value $\alpha$ as long as the frequency of the motor drive voltage is controlled to be maintained at the optimum drive frequency.

Figure 14A:
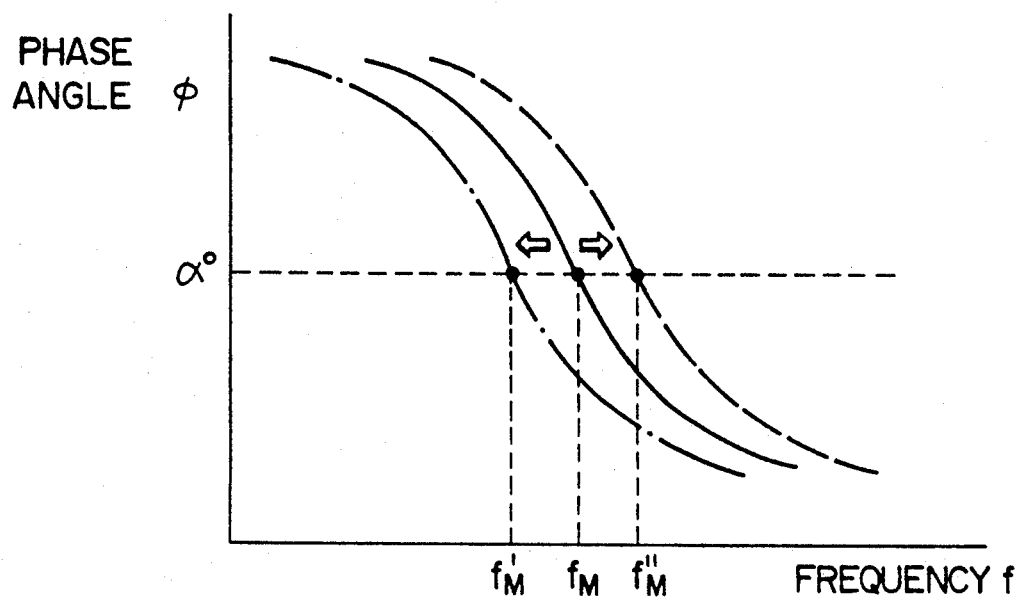
FIG. 14(A) is a graph showing the relationship between the frequency f of the motor drive voltage and the phase difference between the motor drive voltage and the torsional vibration.
Figure 14B:
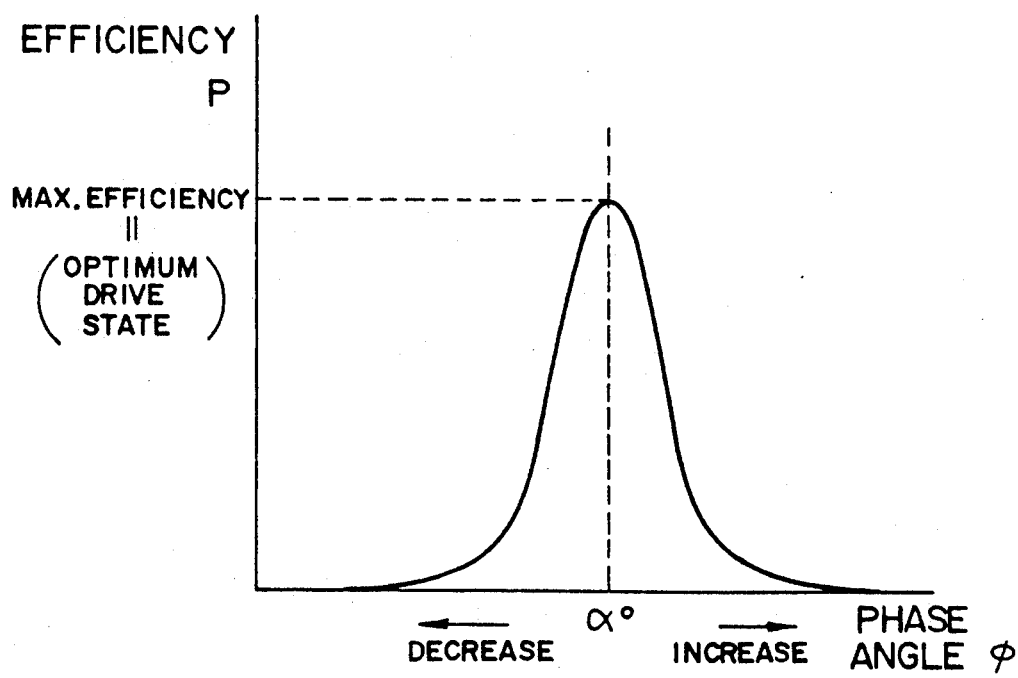
FIG. 14(B) is a graph showing the relationship between the phase difference and the driving efficiency P of the motor.

FIGS. 14(A) and 14(B) illustrate the above fact.

FIG. 14(A) shows the relationship between the frequency f of the motor drive voltage V1 and the phase angle $\phi$ between the motor drive voltage V1 and the torsional vibration signal V2. As various factors such as temperature, load and the like vary as shown in FIG. 14(A), the characteristic curves of the motor also vary as shown by solid, broken and one-dot-chain lines. When the relationship between the phase angle $\phi$ and the output efficiency P of the motor had been measured for such characteristic curves, it was confirmed that for each of the characteristic curves, the motor output efficiency became maximum when the phase angle $\phi$ was equal to the fixed angle $\alpha$, as shown in FIG. 14(B). Although the optimum drive frequency varies changes according to in various operational factors, the phase angle $\phi$ becomes the fixed angle $\alpha$ inherent in a particular motor as long as the frequency of the motor drive voltage V1 is maintained at the optimum drive frequency.

Consequently, the Langevin type ultrasonic bolt-tightening motor can be driven with the maximum efficiency at all times by controlling the frequency of the motor drive voltage V1 so that the phase angle $\phi$ between the motor drive voltage V1 and the detection signal V2 of the torsional vibration sensor 30 will be a fixed angle $\alpha$.

Figure 16:
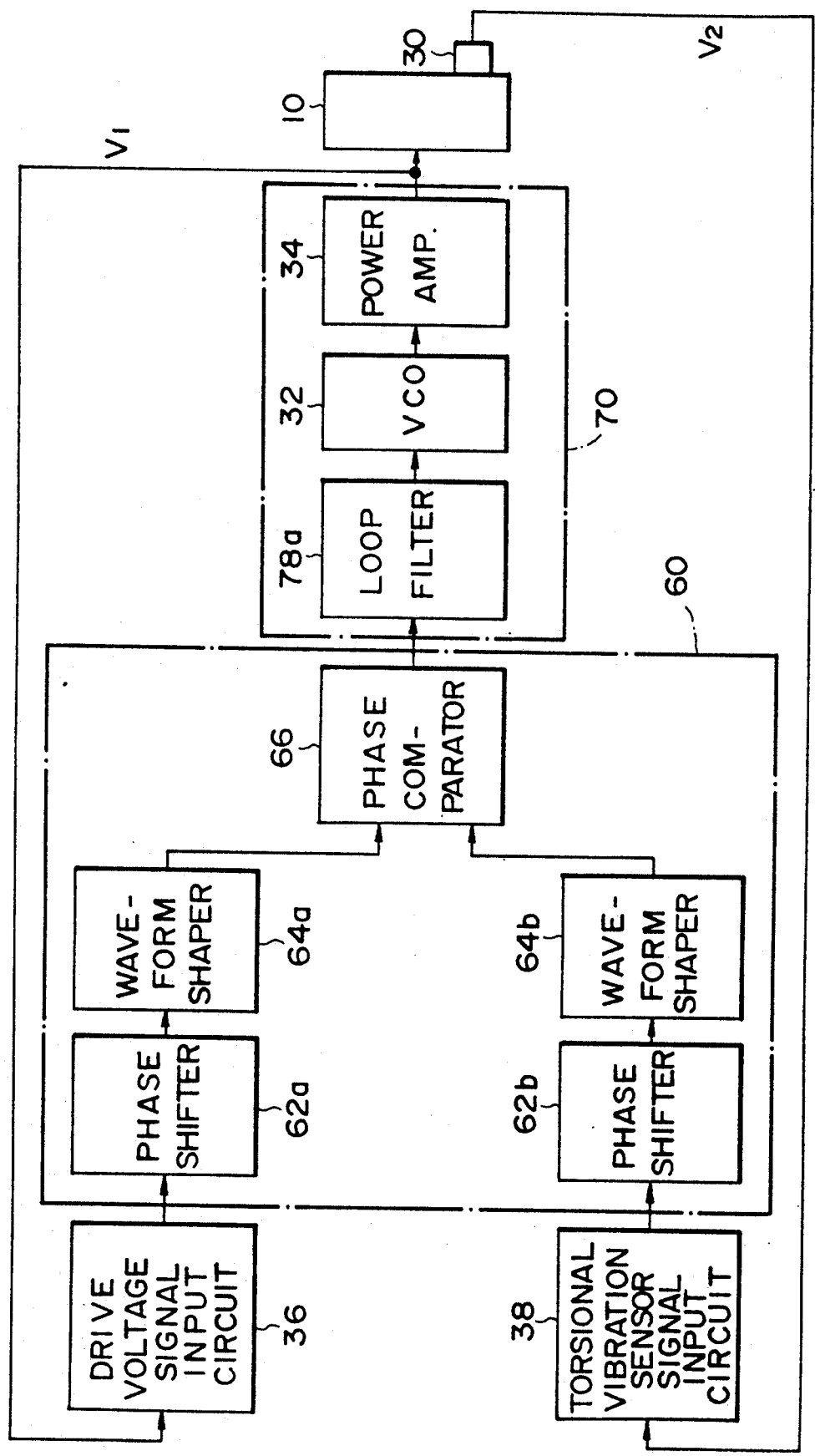
FIG. 16 is a block circuit diagram of the third embodiment of the Langevin type ultrasonic bolt-tightening motor constructed in accordance with the present invention.

FIG. 16 shows a drive circuit of a ultrasonic motor constructed in accordance with the third embodiment.

The ultrasonic motor 10 has a voltage control oscillator (VCO) 32 which outputs an AC voltage having a predetermined frequency. The AC voltage is amplified to a motor drive voltage by a power amplifier 34 and then applied to piezo-electric elements 18 through terminals T3 and T4 to drive the ultrasonic motor 10.

The drive circuit of the third embodiment comprises a drive voltage signal input circuit 36 for receiving the output V1 of the power amplifier 34 and a torsional vibration sensor signal input circuit 38 for receiving the output V2 of the torsional vibration sensor 30. These input circuits 36 and 38 transform the input signals and V1 and V2 respectively into appropriate voltage levels and then output these signals to a phase difference detecting section 60.

The phase difference detecting section 60 comprises phase-shifting circuits 62a and 62b receiving the signals V1 and V2, waveform shaping circuits 64a and 64b receiving the outputs of the phase-shifting circuits 62a and 62b, and a phase comparator 66 for detecting a phase difference between the outputs of the waveform shaping circuits 64a and 64b.

Each of the phase-shifting circuits 62a and 62b shifts only input signals. In the third embodiment, if the input signals V1 and V2 are in the same phase, the adjustment of phase is accomplished so that the output of the phase-shifting circuit 62b delays from the output of the phase-shifting circuit 62a by $\alpha$ degrees.

Each of the waveform shaping circuits 64a and 64b converts a sinusoidal wave signal from the corresponding one of the phase-shifting circuits 62a and 62b into a square wave signal in the same phase, which signal is then outputted therefrom to the phase comparator 66.

In such a manner, the phase comparator 66 detects the phase difference between the two input signals and outputs a positive or negative pulse signal proportional to the detected phase difference to a frequency regulating section 70.

The frequency regulating section 70 comprises a loop filter 78a functioning as a signal converter, the voltage control oscillator (VCO) 32 and the power amplifier 34.

The loop filter 78a is adapted to remove high-frequency and noise components from the pulse signal outputted from the phase comparator 66 to form an integrated output DC voltage. The output voltage of the loop filter 78a is received by the VCO 32.

Thus, the VCO 32 will function to output an AC voltage having a frequency corresponding to the output voltage of the loop filter 78a to the power amplifier 34.

In such an arrangement, the operation is as follows:

When a power switch is first closed, the VCO 32 outputs an AC voltage having its initial frequency fi. The AC voltage is amplified by the power amplifier 34 up to the motor drive voltage V1 required to drive the ultrasonic motor 10, which drive voltage is then applied to the terminals T3 and T4 for driving the ultrasonic motor 10. On application of this voltage, the torsional vibrations are generated in the block members 14 and 16. The torsional vibration sensor 30 produces the torsional vibration signal V2 corresponding to the torsional vibration.

The motor drive voltage signal V1 is supplied from the power amplifier 34 to the drive voltage signal input circuit 36 wherein this signal is lowered to a voltage level suitable for control and then outputted to the phase-shifting circuit 62a. On the other hand, the torsional vibration signal V2 is supplied to the torsional vibration sensor signal input circuit 38 wherein the torsional vibration signal is reduced to a voltage level suitable for control and outputted to the phase-shifting circuit 62b.

The phase-shifting circuits 62a and 62b function to shift the phases of the motor drive voltage V1 and torsional vibration signal V2 inputted thereto. More particularly, if the input signals V1 and V2 are in the same phase, the regulation is carried out so that the output of the phase-shifting circuit 62b is shifted from that of the phase-shifting circuit 62a by a fixed angle $\alpha$ at all times even if there is any change in frequency. If the control is performed so that the output signals of the phase-shifting circuits 62a and 62b becomes in-phase, the phase difference between the signals V1 and V2 can be equal to the fixed angle $\alpha$. The outputs of the phase-shifting circuits 62a and 62b are waveform shaped to square wave signals by the waveform shaping circuits 64a and 64b respectively, as shown in FIGS. 17(A) and 17(B). These square wave signals are then inputted to the phase comparator 66.

Part Z1 in FIG. 17 indicates a phase delay of the output signal of the waveform shaping circuit 64a relative to the output signal of the waveform shaping circuit 64b. In such a situation, the present frequency of the motor drive voltage is not the optimum drive frequency and the phase angle $\phi$ becomes larger than the fixed angle $\alpha$. At this time, as shown in FIG. 17(C), the phase comparator 66 outputs a negative pulse signal about a reference high impedance in the form of a pulse having its pulse width corresponding to part Z1 which is a phase difference between the reference high impedance and the negative pulse signal. Similarly, part Z2 in FIG. 17(B) is a phase delay from the output of the waveform shaping circuit 62b. Thus, the phase comparator 66 outputs a negative pulse signal having a pulse width corresponding to this delay.

In part Z3 of FIG. 17(B), the output signals of the waveform shaping circuits 64a and 64b are in phase. In this case, the phase difference between the input signals V1 and V2 of the phase-shifting circuits 62a and 62b is the fixed angle $\alpha$, as described. Thus, the frequency of the motor drive voltage will be the optimum drive frequency fM in the state Z3. Under such a condition, the output of the phase comparator 66 is maintained at high-impedance and no pulse signal is outputted therefrom.

Parts Z4 and Z5 of FIG. 17(B) indicate that there is a phase delay in the output signal of the waveform shaping circuit 64a. In such a case, the phase comparator 66 outputs a positive pulse signal having its pulse width which corresponds to the delay width.

The loop filter 78a is responsive to the positive or negative pulse signal from the phase comparator 66 or the high-impedance signal to output a given analog voltage signal.

FIG. 17(D) shows the output signal of the loop filter 78a, which signal varies as follows:

If the aforementioned phase angle $\phi$ is larger than the fixed angle $\alpha$, the frequency of the motor drive voltage V1 must be increased. On the contrary, if the phase angle $\phi$ is smaller than the fixed angle $\alpha$, the frequency of the motor drive voltage V1 should be decreased.

The phase comparator 66 outputs a negative pulse if the phase angle $\phi$ is larger than the fixed angle $\alpha$, as in the parts Z1 and Z2 in FIG. 5. Thus, the DC voltage in the loop filter 78a will be lowered while the oscillation frequency of the VCO 32 will be increased. If the phase angle $\phi$ becomes equal to the fixed angle $\alpha$ by the increase of the oscillation frequency, the output voltage of the phase comparator 66 is maintained constant as in the part Z3 while the oscillation frequency of the VCO 32 is also maintained constant. If the phase angle $\phi$ becomes smaller than the fixed angle $\alpha$ as in the parts Z4 and Z5, the phase comparator 66 will output a positive pulse signal which in turn serves to increase the DC voltage of the loop filter 78a and to decrease the oscillation frequency of the VCO 32.

In such a manner, the VCO 32 functions to increase the oscillation frequency when the output voltage of the loop filter 78a decreases and to decrease the oscillation frequency if the output voltage of the loop filter 78a increases. Thus, the frequency V1 of the motor drive voltage will be increased if the phase angle $\phi$ becomes larger than the fixed angle $\alpha$ and decreased if the phase angle $\phi$ becomes smaller than the fixed angle $\alpha$.

FIGS. 18(A), 18(B) and 18(C) show waveforms formed when the frequency of the motor drive voltage has been regulated in such a manner, that is, when the phase angle between the motor drive voltage signal V1 and the torsional vibration signal V2 is maintained at the fixed angle $\alpha$ and the motor is being driven with the optimum drive frequency.

FIG. 18(A) indicates the actually applied motor drive voltage signal V1 and the torsional vibration signal V2 generated by application of the motor drive voltage. Since the present drive voltage is in the optimum drive frequency, the phase angle $\phi$ between the signals V1 and V2 has been regulated to the fixed angle $\alpha$.

FIG. 18(B) shows signal waveforms outputted, at this time, from the drive voltage signal input circuit 36 and the torsional vibration sensor signal input circuit 38. Each of the signal waveforms is regulated to a voltage level suitable for control. The phase angle $\phi$ becomes equal to the fixed angle $\alpha$.

FIG. 18(C) illustrates signal waveforms outputted from the waveform shaping circuits 64a and 64b at this time. These waveforms are completely in phase. This enables the phase difference between the input signals V1 and V2 of the waveform shaping circuits 62a and 62b to be controlled to be the fixed angle $\alpha$.

In such a manner, the third embodiment can perform such an adjustment so that the torsional vibration signal V2 is delayed from the motor drive voltage signal V1 by the fixed angle a. In other words, the frequency of the motor drive voltage can be feedback controlled to regulate the signals V1 and V2 such that their phases will be in phase. As a result, the phase difference between the signals V1 and V2 can be maintained at the fixed angle $\alpha$. Such a control can regulate the frequency of the motor drive voltage at all times such that it follows the optimum drive frequency despite varying according to such factors as temperature, load and the like. Consequently, the Langevin type ultrasonic bolt-tightening motor can be driven efficiently.

It is to be understood that the present invention is not limited to the third embodiment and may be applied to many modifications within the scope of the present invention.

For example, the analog drive circuit for the ultrasonic motor 10 may be replaced by any digital drive circuit, if required. The control may be carried out by a computer.

Although the third embodiment has been described using phase-shifting circuits 62a and 62b to maintain the phase difference equal to the fixed angle $\alpha$, the phase-shifting circuits 62a and 62b may be omitted. In such a case, the phases of the signals V1 and V2 may be compared with each other directly by the phase comparator 66 so that the phase difference therebetween will be maintained controlled to be equal to the fixed angle $\alpha$.

Fourth Embodiment

In the third embodiment, the frequency of the motor drive voltage can be satisfactorily controlled only when the amplitude of the signal V2 outputted from the vibration sensor 30 is in a relatively large active area. The frequency of the motor drive voltage cannot be controlled when the amplitude of the signal V2 of the vibration sensor 30 is in the dead area wherein it is remarkably decreased or unstable.

For example, if the frequency of the motor drive voltage can be set at or near the optimum drive frequency on initiation of the motor as shown in FIGS. 15(A) and 15(B), the torsional vibration can be generated with sufficient magnitude. Thus, the amplitude of the signal from the vibration sensor 30 can be sufficiently large. In such a situation, the phase difference $\phi$ between the motor drive voltage V1 and the torsional vibration signal V2 can be specified, so that, based on the specified phase difference $\phi$, the frequency of the motor drive voltage V1 can be moved to the optimum drive frequency to start the motor.

If the frequency of the motor drive voltage V1 used when starting the motor is set at a level farther than the optimum drive frequency, the longitudinal and torsional vibrations generated in the stator section 11 are remarkably reduced. As shown in FIG. 15(C), thus, the output signal of the vibration sensor 30 also is greatly reduced in amplitude and contains noises, leading to a very unstable state of the motor. In such a situation, the phase difference between the motor drive voltage signal V1 and the torsional vibration signal V2 becomes ambiguous. Therefore, the frequency of the motor drive voltage V1 cannot be controlled to be set to the optimum drive frequency. As a result, the start of the motor becomes impossible.

If the frequency of the motor drive voltage V1 is set at a frequency which generates any vibration other than the longitudinal and torsional vibrations, such as flexural vibration or the like, the torsional vibration sensor 30 may generate an abnormal signal having its frequency different from the frequency of the motor drive voltage V1, as shown in FIG. 15(D). In such a condition, the phase difference between the longitudinal and torsional vibrations cannot be accurately determined. Thus, the frequency of the motor drive voltage V1 cannot be moved to the optimum drive frequency. This makes the start of the motor impossible.

In this embodiment, it is judged whether the output signal of the vibration sensor 30 is in such an active area as shown in FIGS. 15(A) and 15(B) or in such a dead area as shown in FIGS. 15(C) and 15(D). If it is judged that the output signal is in the dead area, the frequency of the motor drive voltage V1 is regulated such that the output of the vibration sensor 30 moves to the active area. Thereafter, the frequency will be regulated based on the phase angle $\phi$.

In such a manner, the frequency of the motor drive voltage V1 can be automatically controlled to move to the optimum drive frequency. Thus, the motor can be started reliably.

Figure 19B:
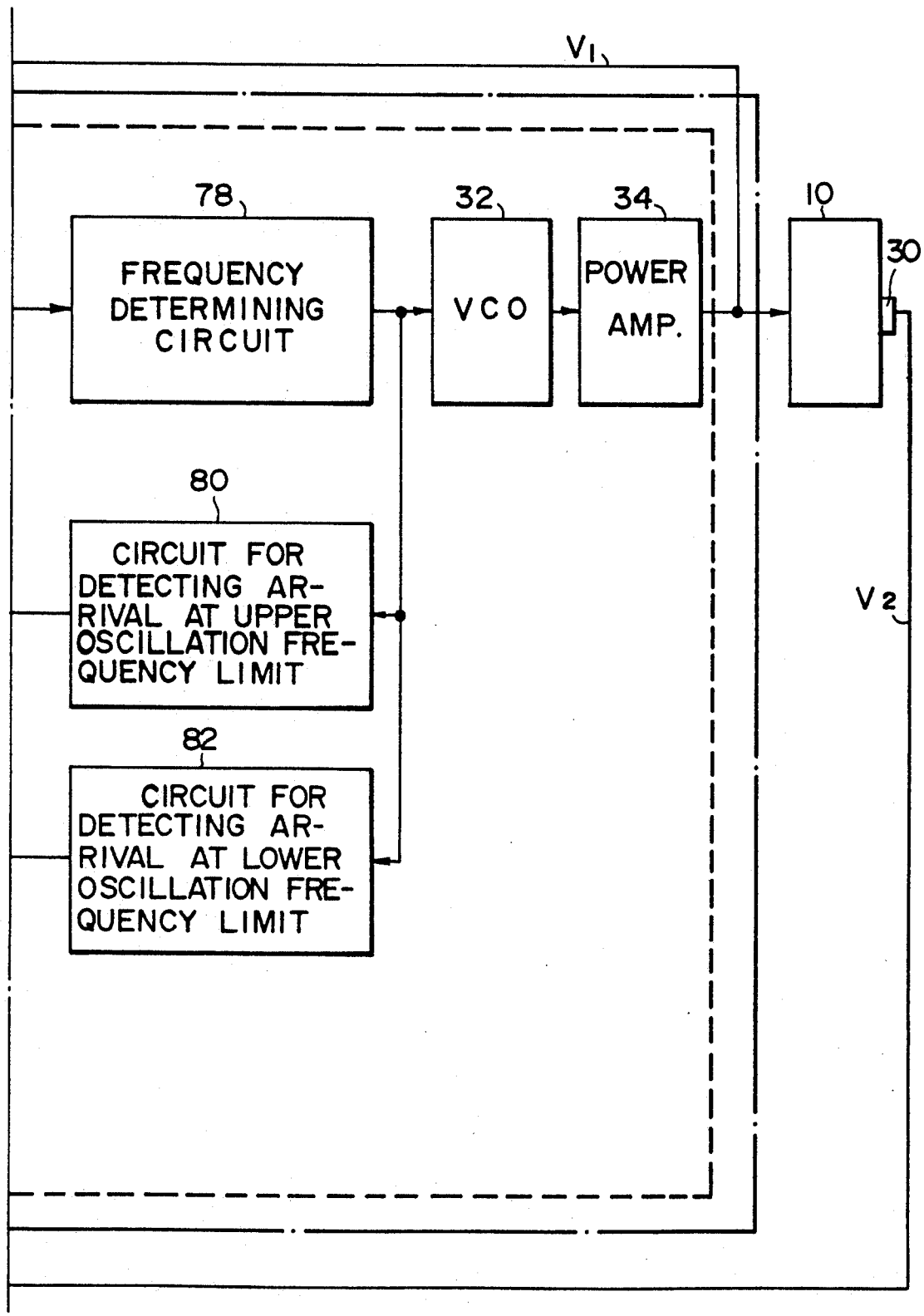

FIG. 19 shows the ultrasonic motor drive circuit constructed according to the fourth embodiment, in which parts similar to those of the previous embodiments are denoted by similar reference numerals and will not be described further.

The drive circuit includes a signal input circuit 36 receiving the motor drive voltage signal V1 from the amplifier 34 and a signal input circuit 38 receiving the output signal V2 of the torsional vibration sensor 30. Each of the input circuits 36, 38 is adapted to transform the input signal V1, V2 into an appropriate voltage level, with the transformed signal being then inputted to a frequency controlling section 50. The output signal V2 of the torsional vibration sensor signal input circuit 38 is further inputted to an amplitude discriminating section 44 which functions as a sensor output discriminating section.

The amplitude discriminating section 44 is adapted to judge that the output signal V2 of the torsional vibration sensor 30 input through the torsional vibration sensor signal input circuit 38 is in the active area when it is above a predetermined level after noise and abnormal signal components have been removed therefrom and to output a high-level signal to a control signal switching circuit 72. If not so, the amplitude discriminating section 44 judges that the sensor outputs are in the dead area and outputs a low-level signal.

The frequency control section 50 is adapted to control the frequency of the motor drive voltage V1 such that the output signal of the vibration sensor 30 will be moved to the active area when a low-level signal indicative of the sensor output in the dead area is inputted from the amplitude discriminating section 44. When a high-level signal representative of the sensor output in the active area is inputted from the amplitude discriminating section 44, the frequency control section 50 is responsive to the motor drive voltage signal V1 and the torsional vibration signal V2 to maintain the frequency of the motor drive voltage V1 at the optimum drive frequency.

In the fourth embodiment, the frequency control section 50 comprises a phase difference detecting section 60 and a frequency regulating section 70.

The phase difference detecting section 60 is adapted to compare phases of the motor drive voltage V1 and torsional vibration signal V2 inputted through the signal input circuits 36 and 38 to produce a control signal used to shift the phase difference $\phi$ to a fixed angle $\alpha$ providing the maximum efficiency. The control signal is outputted to the frequency regulating section 70.

The frequency regulating section 70 comprises a control signal switching circuit 72, a frequency increasing circuit 74, a frequency decreasing circuit 76, a frequency determining circuit 78, a circuit 80 for detecting arrival at an upper-limit oscillation frequency, a circuit 82 for detecting arrival at a lower-limit oscillation frequency, a power amplifier 34 and said VCO 32.

The frequency increasing circuit 74 outputs a control signal for increasing the oscillation frequency while the frequency decreasing circuit 76 outputs a control signal for decreasing the oscillation frequency.

The control signal switching circuit 72 outputs a frequency control signal which is the output of the phase difference detector 60 to the frequency determining circuit 78 when a high-level signal is outputted from the switching signal generator 46. When a low-level signal is outputted from the switching signal generator 46, the control signal switching circuit 72 is responsive to the outputs of the detecting circuits 80 and 82 to output any one of the outputs of the frequency increasing and decreasing circuits 74 and 76 to the frequency determining circuit 78 as a frequency control signal.

The frequency determining circuit 78 is responsive to the inputted frequency control signal to control the oscillation frequency of the VCO 32. More particularly, when the frequency determining circuit 78 receives the control signal from the phase difference detector 60, the circuit 78 controls the oscillation frequency of the VCO 32 such that the phase difference will be equal to the fixed angle $\alpha$. When the frequency determining circuit 78 receives the control signals from the frequency increasing and decreasing circuits 74 and 76, the circuit 78 controls to increase or decrease the oscillation frequency of the VCO 32.

The circuit 80 for detecting arrival at the upper-limit oscillation frequency is responsive to the output of the frequency determining circuit 78 to detect whether or not the oscillation frequency of the VCO 32 arrives at its predetermined upper limit. If so, the circuit 80 outputs a detection signal to the control signal switching circuit 72. Similarly, the circuit 82 for detecting arrival at lower-limit oscillation frequency is adapted to judge whether or not the oscillation output of the VCO 32 arrives at its predetermined lower limit. If so, the circuit 82 outputs a detection signal to the control signal switching circuit 72.

The frequency regulating section 70 will operate as follows:

FIG. 21(A) shows the relationship between the phase difference $\phi$ between the motor drive voltage V1 and the output signal V2 of the vibration sensor 30 and the frequency f of the motor drive voltage V1; FIG. 21(B) shows the relationship between the output signal amplitude of the torsional vibration sensor 30 and the frequency f of the motor drive voltage V1; and FIG. 21(B') shows the relationship between the amplitude of the output signal of the torsional vibration sensor 30 after noise and abnormal signal components have been removed therefrom and the frequency f of the motor drive voltage V1. These characteristic curves vary as shown by solid, broken and one-dot-chain lines, depending on changes in various factors such as temperature, load and the like.

If the output signal amplitude of the torsional vibration sensor 30 is above the reference level VS1 after noise and abnormal signal components have been removed therefrom, the amplitude discriminating section 44 provides a high-level signal indicative of the sensor output in the active area to the control signal switching circuit 72. If the output signal is not above the reference level VS1 the amplitude discriminating section 44 provides, a low-level signal indicative of the sensor output in the dead area to the control signal switching circuit 72.

The circuits 80 and 82 for detecting arrival at upper- and lower-limit oscillation frequencies set upper- and lower-limit frequencies fU and fD in the dead area, respectively. These upper- and lower-limit frequencies fU and fD are preferably established within a range of frequency in which they will not be in the active area even if the characteristic curves vary due to changes in temperature, load and the like.

When the power switch (not shown) is turned on and if a low-level signal indicative of the sensor output in the dead area is inputted from the amplitude discriminating section 44 to the control signal switching circuit 72, the latter first causes the frequency increasing circuit 74 to provide its output to the frequency determining circuit 78 such that the oscillation frequency of the VCO 32 increases toward the upper-limit frequency fU. If the sensor output come into the active area during the increase of the frequency, the output of the amplitude discriminating section 44 changes from low-level to high-level. This causes the control signal switching circuit 72 to provide the output of the phase difference detecting section 60 to the frequency determining circuit 78 which in turn controls the oscillation frequency of the VCO 32 such that the phase difference $\phi$ between the sensor outputs becomes equal to the fixed angle $a$. Thus, the frequency of the motor drive voltage V1 will be maintained at the optimum drive frequency.

If the amplitude discriminating section 44 outputs no high-level signal even when the oscillation frequency of the VCO 32 is increased at the upper-limit frequency fU, the control signal switching circuit 72 then causes the frequency decreasing circuit 76 to provide its output, as a control signal, to the frequency determining circuit 78. This causes the oscillation frequency of the VCO 32 to decrease from the upper-limit frequency fU to the lower-limit frequency fD. If the output of the amplitude discriminating section 44 changes from low-level to high-level during the decrease of frequency, the control signal switching circuit 72 causes the phase difference detecting circuit 60 to provide its output to the frequency determining circuit 78 as a control signal.

If the output of the amplitude discriminating section 44 does not reach high-level even during the decrease of frequency for any reason, the increasing of the oscillation frequency to the upper-limit frequency fU is repeated as the oscillation frequency arrives at the lower-limit frequency fD.

In such a manner, when the output of the vibration sensor 30 is in the dead area wherein they are uncontrollable, the drive circuit of the fourth embodiment causes the sensor outputs to move into the active area by repeating the increasing and decreasing of the frequency of the VCO 32 to the upper- and lower-limit frequencies fU and fD.

For example, even if the frequency of the motor drive voltage V1 is in the dead area on start of the motor, it can be automatically moved into the active area. Therefore, the motor can be started reliably.

It is obvious that when the frequency of the motor drive voltage V1 is in the active area, the motor can be started.

Figure 20B:
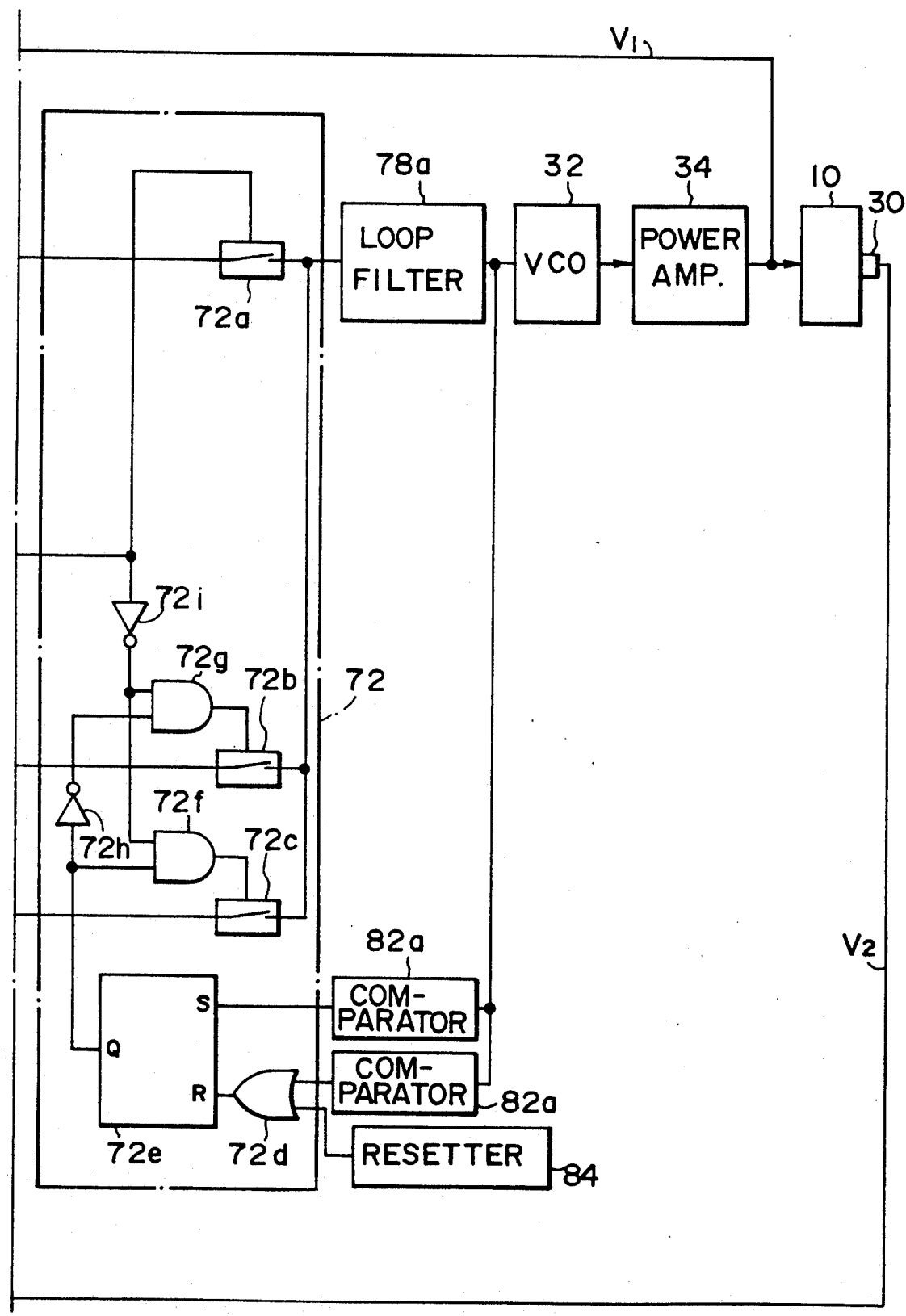

FIG. 20 shows the detailed arrangement of the motor drive circuit shown in FIG. 19.

First of all, the arrangement of the amplitude discriminating section 44 will be described in detail.

The amplitude discriminating section 44 comprises a noise filter 44a, an absolute value amplifying circuit 44b and a comparator 44c.

The noise filter 44a serves to remove noise and abnormal signal components from the sensor output V2 inputted thereto through the input circuit 38 and also functions to output only amplitudes affected by the longitudinal vibration detected by the sensor to the absolute value detecting circuit 44b. The absolute value detecting circuit 44b is adapted to output an AC voltage signal corresponding to the amplitude of the sensor output inputted to the comparator 44c. The comparator 44c includes a predetermined reference level VS1. If the input signal exceeds the reference level, the comparator 44c outputs a high-level signal.

Only when the amplitude affected by the torsional vibration is above the reference level is it judged that the sensor output is in the active area. Thus, the comparator 44c outputs a high-level signal. If the amplitude is not above the reference level it is judged that the sensor output is in the dead area. The comparator 44c outputs a low-level signal.

FIG. 22 is a timing chart illustrating the operation of the sensor output discriminating section 40, in which the horizontal axis represents the oscillation frequency f of the VCO 32.

When the torsional vibration sensor signal input circuit 38 outputs a torsional vibration signal V2, its amplitude is as shown in FIG. 22(B). After noise and abnormal signal components have been removed by the noise filter 44a, the output signal V2 is then amplified in absolute value by the absolute value amplifying circuit 44b and supplied to the comparator 44c as a DC signal as shown in FIG. 22(C).

The comparator 44c compares such a DC signal with the reference level VS1. If the input signal is above the reference level, the comparator 44c judges that the input signal is a controllable sensor output and outputs a high-level signal, as shown in FIG. 22(D).

The phase difference detecting section 60 of this embodiment is similar to those of the second embodiment and will not be described further. The frequency determining circuit 78 of this embodiment is comprised of the aforementioned loop filter 78a and will not be described further.

Each of the circuits 80, 82 for detecting arrival at upper- and lower-limit oscillation frequencies includes a comparator 80a, 82a as in the second embodiment.

Each of the frequency increasing and decreasing circuits 74, 76 includes a discharger 74a, a charger 76a, as in the second embodiment.

The control signal switching circuit 72 comprises the above three analog switches 72a, 72b and 72c, an OR gate 72d, an RS latch circuit 72e, inverters 72h and 72i, and AND gates 72g and 72f, as in the second embodiment. Each of the three analog switches 72a, 72b or 72c can be turned on only when it receives a high-level signal from the corresponding each of the comparator 46c, the AND gates 72g, and 72f.

In operation, the power switch is first turned on. The latch circuit 72e is reset with its output Q being initially set at low-level. Following the resetting, the VCO 32 outputs an AC voltage having its initial frequency f1. The AC voltage is amplified by the power amplifier 34 to form a motor drive voltage V1 required to drive the ultrasonic motor 10, which voltage V1 is then applied to the terminals T3 and T4 leading to the ultrasonic motor 10.

If the frequency of this motor drive voltage V1 is near the optimum drive frequency, longitudinal and torsional vibrations are generated in the block members 14 and 16. Then, the torsional vibration sensor 30 generates a torsional vibration signal V2 corresponding to the torsional vibration. On the contrary, if the frequency of the motor drive voltage V1 is farther from the optimum drive frequency, the torsional vibration sensor 30 outputs only a detection signal having its reduced amplitude and may generate noise or abnormal signal components in certain circumferences.

The motor drive voltage V1 outputted from the power amplifier 34 is supplied through the signal input circuit 36 to the phase-shifting circuit 62a. On the other hand, the torsional vibration signal V2 is provided to the noise filter 44a and the phase-shifting circuit 62b through the torsional vibration sensor signal input circuit 38. The noise filter 44a is responsive to the torsional vibration signal to output a signal to the absolute value amplifying circuit 44b which in turn outputs a DC signal corresponding to the amplitude of the signal from the noise filter 44a.

If the frequency of the motor drive voltage V1 is not closet the optimum drive frequency, the output signal of the absolute value amplifying circuit 44b will be in the dead area wherein it is below the reference level. As a result, the comparator 44c outputs a low-level signal which is used to turn only the analog switch 72b on. Thus, the output of the discharger 74a is provided, as a control signal, to the loop filter 78a such that the frequency f1 of the motor drive voltage V1 increases to the upper-limit frequency fU. If the active area exists between the initial frequency of the motor drive voltage V1 and the upper-limit frequency fU, the frequency f of the motor drive voltage V1 moves into the active area and at the same time the output of the comparator 44c changes from low-level to high-level to turn only the analog switch 72a on.

On the contrary, if the active area does not exist between the initial frequency f1 and the upper-limit frequency fU, the output Q of the latch circuit 72e is inverted at the same time as the frequency of the motor drive voltage V1 arrives at the upper-limit frequency fU, so that the analog switch 72c is turned on and the analog switches 72b and 72a are turned off. Thus, the output of the charger 76a is inputted to the loop filter 78a as a control signal to decrease the frequency of the motor drive voltage V1 from the upper-limit frequency fU to the lower-limit frequency fD.

As will be apparent from the foregoing, if it is judged that the sensor outputs are in the dead area on start of the motor, the drive circuit of the fourth embodiment causes the frequency of the motor drive voltage V1 to reciprocate between the upper-and lower-limit frequencies fU and fD. Thus, the frequency f of the motor drive voltage V1 can be controlled to move the sensor outputs into the active area.

At the same time as the sensor outputs move into the active area, the analog switches 72b and 72c are turned off and the analog switch 72a is turned on, as described.

In response to the output of the phase comparator 66, the control of frequency will be started.

The phase comparator 66 then outputs a control signal used to shift the phase difference $\phi$ between the motor drive voltage V1 from the power amplifier 34 and the torsional vibration signal V2 from the torsional vibration sensor 30 to a preselected phase difference equal to the fixed angle $\alpha$ so as to provide maximum efficiency. The frequency of the motor drive voltage V1 is set to the optimum drive frequency fM. Thus, the motor may be started reliably from the dead area.

Once the motor is started, it may be successively driven with the voltage of the optimum drive frequency fM, based on the output signals V1 and V2.

If the sensor outputs move from the active area to the dead area for any reason during operation of the motor, the motor may be stopped. In accordance with the fourth embodiment, however, the frequency of the motor drive voltage V1 may be automatically moved into the active area. Therefore, the motor can be reliably re-started.

If the frequency of the motor drive voltage V1 is near the optimum drive frequency on start of the motor, the sensor outputs will be in the active area wherein they are above the respective reference levels. In such a case, only the analog switch 72a is turned on and the control of frequency can be similarly carried out based on the output of the phase comparator 66.

FIGS. 18(A), 18(B) and 18(C) illustrate waveforms at various circuit parts which are obtained in such a state that the frequency of the motor drive voltage has been controlled to be maintained at the optimum drive frequency in the active area.

FIG. 18(A) indicates the actually applied motor drive voltage signal V1 and the torsional vibration signal V2 generated by application of the motor drive voltage. Since the frequency of the drive voltage V1 is the optimum drive frequency fM, the phase angle $\phi$ between the signals V1 and V2 has been regulated to the fixed angle $\alpha$. FIG. 18(B) shows signal waveforms outputted, at this time, from the signal input circuit 36 and torsional vibration sensor signal input circuit 38. Each of the signal waveforms is regulated to a voltage level suitable for control. The phase angle $\phi$ becomes equal to the fixed angle $\alpha$. FIG. 18(C) illustrates signal waveforms outputted from the waveform shaping circuits 64a and 64b at this time. These waveforms are completely in phase. This enables the phase difference between the input signals V1 and V2 of the phase-shifting circuit 62a and 62b to be controlled to be the fixed angle $\alpha$.

In such a manner, the drive circuit of this embodiment feedback controls the frequency of the motor drive voltage V1 so that the phase difference between the motor drive voltage V1 and the torsional vibration signal V2 will be maintained the fixed angle $\alpha$. Thus, the frequency of the motor drive voltage V1 can be regulated to follow the optimum drive frequency fM at all times, despite variances caused by changes in magnitude of load, type of motor and the like. As a result, the Langevin type ultrasonic bolt-tightening motor can be driven with increased efficiency.

Although the aforementioned embodiments of the present invention use phase-shifting circuits 62a and 62b to provide the phase difference equal to the fixed angle $\alpha$ between two signals V1 and V2, the present invention is not limited to such an arrangement. If required, the phase-shifting circuits 62a and 62b may be omitted. In this case, the phase comparator 66 directly compares the signals V1 and V2 to provide the fixed angle α therebetween.

The third and fourth embodiments have been described as drive circuit which can drive the langevin type ultrasonic bolt-tightening motor with the maximum efficiency at all times by regulating the frequency of the motor drive voltage such that the phase angle φ is within a given allowable range of optimum phase angle about the angle φ.

Figure 23A:
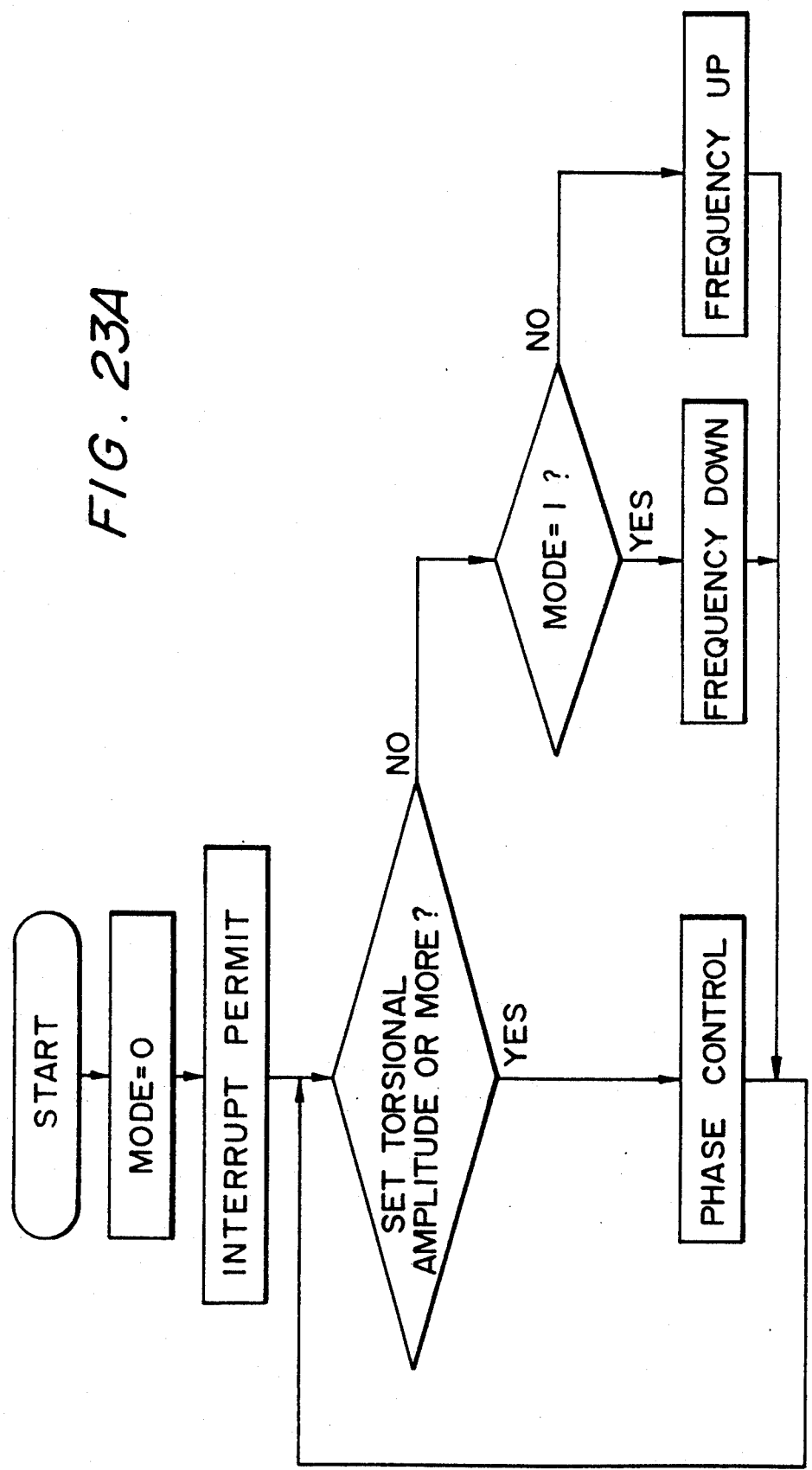
FIG. 23(A) is a flow chart showing the main routine.
Figure 23B:
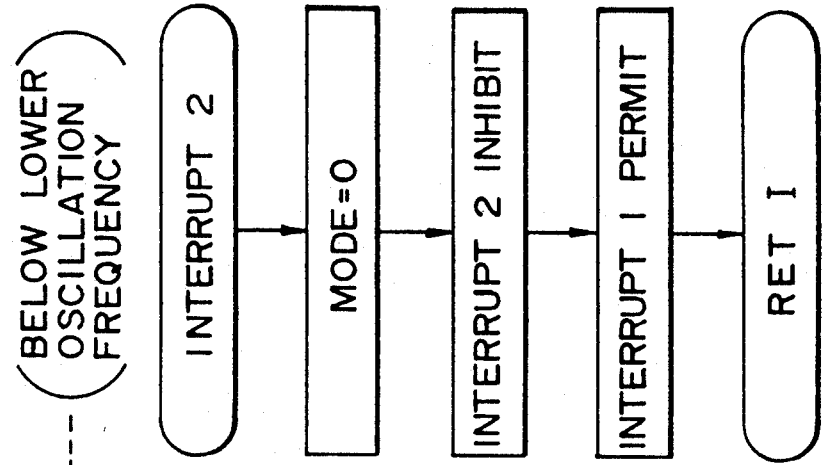
FIGS. 23(B) and 23(C) are flow charts showing the interrupt routine.
Figure 23C:
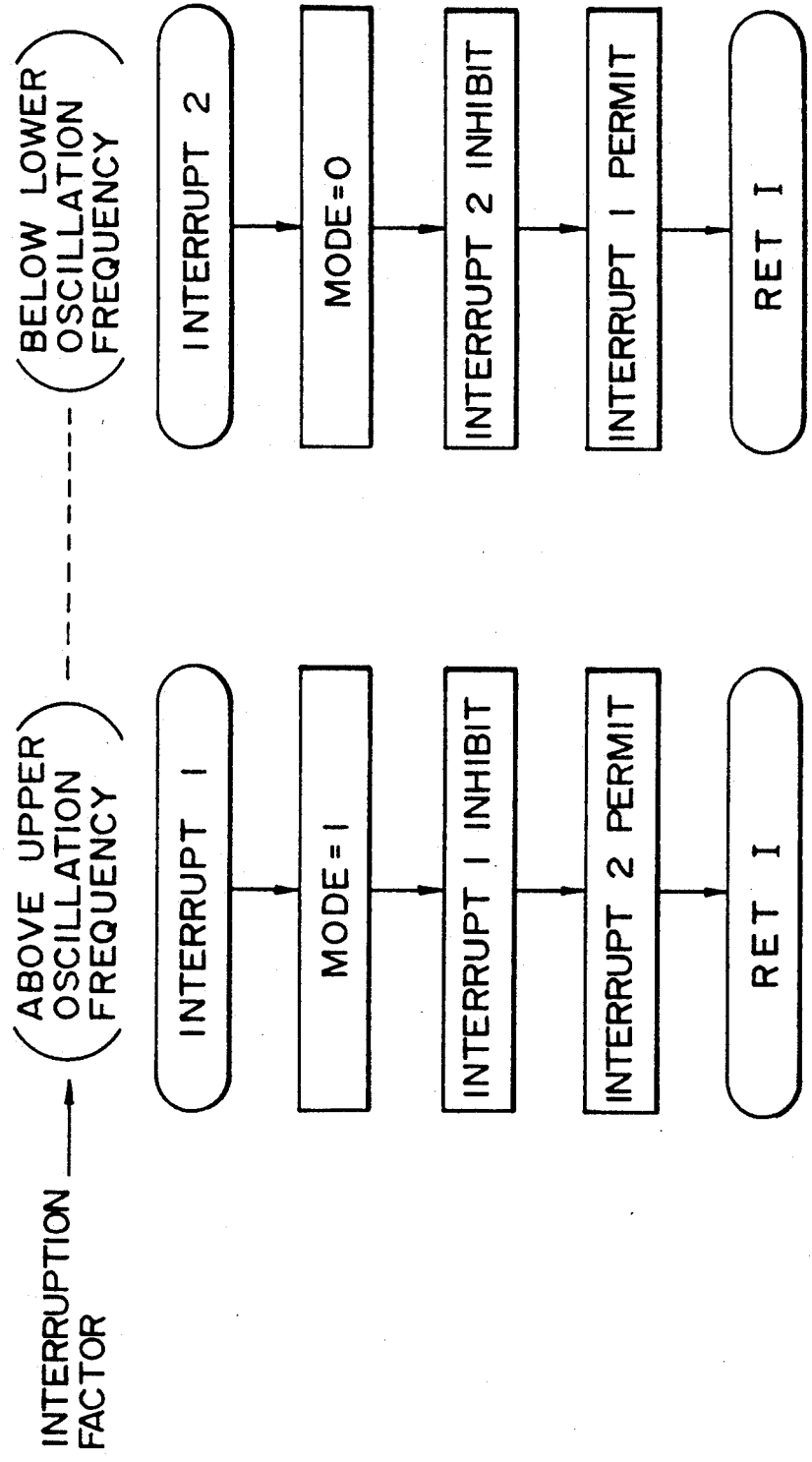

Furthermore, the present invention may utilize any suitable computer such as MPU to control the motor in such a manner as shown by a flow chart in FIG. 23.

As will be apparent from the foregoing, the drive circuit of the present invention can reliably start the Langevin type ultrasonic bolt-tightening motor with an improved efficiency by automatically causing the frequency of the motor drive voltage to track the optimum drive frequency, even if the output(s) of the vibration sensor(s) is (are) in the dead area.

The present invention is not limited in using only one vibration sensor, as the longitudinal vibration sensor and the torsional vibration sensor each, may use a plurality of vibration sensors.

We claim:

1. A drive circuit for a Langevin type ultrasonic bolt-tightening motor comprising a stator section including a piezo-electric element to which a motor drive voltage having a predetermined frequency is applied and a rotor section rotationally driven by longitudinal and torsional vibrations resulting from the application of the motor drive voltage to the piezo-electric element, said drive circuit comprising:

a longitudinal vibration sensor for detecting the longitudinal vibration in said stator section;

a torsional vibration sensor for detecting the torsional vibration in said stator section; and frequency control means for controlling the frequency of said motor drive voltage such that the phase difference between the signals detected by said longitudinal and torsional vibration sensors will be within a given range of an optimum phase angle of 90 degrees so as to provide maximum efficiency.

2. A drive circuit as defined in claim 1, wherein said frequency control means comprises a phase difference detecting section for detecting a phase angle φ which corresponds to the phase difference between a signal V3 detected by said longitudinal sensor and a signal V2 detected by said torsional vibration sensor; and a frequency regulating section for controlling the frequency of said motor drive voltage such that the phase angle φ detected by said phase difference detecting section will be a phase angle of 90 degrees so as to provide maximum efficiency.

3. A drive circuit as defined in claim 1, wherein said torsional vibration sensor is fixedly mounted on the side of said stator section at a location that is vibrated by the torsional vibration and wherein said longitudinal vibration sensor is fixedly mounted on said stator section to be perpendicular to the axis of said stator section at a location that is vibrated by the longitudinal vibration.

4. A drive circuit as defined in claim 2 wherein said phase difference detecting section comprises phase-shifting circuit means for shifting the phases of said detection signals V3 and V2 of the longitudinal and torsional vibration sensors; and a phase comparator for detecting the phase difference between the detection signals V3 and V2 of said phase-shifting circuit means, and wherein said frequency regulating section is effective to control the frequency of the motor drive voltage so that the phase difference detected by said phase comparator becomes zero, so that the detection signal V3 is shifted relative to the detection signal V2 by 90 degrees.

5. A drive circuit as defined in claim 4 wherein said frequency regulating section comprises a signal converting section for converting the phase difference detected by said phase comparator into a control voltage signal;

a voltage control oscillator for outputting oscillation frequencies controlled based on said control voltage signal;

and a power amplifier for amplifying the oscillation output of said voltage control oscillator up to a drive voltage, said drive voltage being then applied to said piezo-electric element means.

6. A drive circuit as defined in claim 1, further comprising sensor output discriminating means responsive to the detection signals of said vibration sensors for discriminating whether said detection signals are in the active area wherein the motor is controllable or in the dead area wherein the motor is difficult to control, and wherein said frequency control means is effective to control the frequency of the motor drive voltage such that the detection signals of said vibration sensors are moved into the active area when the detection signals are in the dead area and to control the frequency of the motor drive voltage such that the phase difference between the detection signals of said longitudinal and torsional vibration sensors is within a given range of an optimum phase angle of about 90 degrees so as to provide maximum efficiency when the detection signals are in the active area.

7. A drive circuit as defined in claim 6, wherein said frequency control means comprises:

a phase difference detecting section for detecting a phase angle φ corresponding to the phase difference between the detection signals of said longitudinal and torsional vibration sensors;

and a frequency regulating section for controlling the frequency of the motor drive voltage such that the detection signals of said vibration sensors are moved into the active area when the detection signals are in the dead area and for controlling the frequency of the motor drive voltage such that the phase angle φ detected by said phase difference detecting section is within a given range of an optimum phase angle of about 90 degrees so as to provide maximum efficiency when the detection signals are in the active area.

8. A drive circuit as defined in claim 7 wherein said frequency regulating section is effective to move the frequency of the motor drive voltage between predetermined upper- and lower-limit frequencies such that the detection signals move into the active area when they are in the dead area.

9. A drive circuit as defined in claim 6, wherein said torsional vibration sensor is fixedly mounted on the side of said stator section at a location that is vibrated by the torsional vibration and wherein said longitudinal vibration sensor is fixedly mounted on said stator section to be perpendicular to the axis of said stator section at a location that is vibrated by the longitudinal vibration.

10. A drive circuit as defined in claim 7, wherein said phase difference detecting section comprises phase-shifting circuit means of shifting the phases of a longitudinal vibration detection signal V3 and a torsional vibration signal V2;

and a phase comparator for detecting the phase difference between the detection signals V3 and V2 of said phase-shifting circuit means, and wherein said frequency regulating section is effective to control the frequency of the motor drive voltage so that the detection signals of said vibration sensors move into the active area when they are in the dead area and to control the frequency of the motor drive voltage such that the phase difference detected by said phase comparator becomes zero when the detection signals of said vibration sensors are in the active area, so that the detection signal V3 is shifted relative to the detection signal V2 by 90 degrees.

11. A drive circuit for a Langevin type ultrasonic bolt-tightening motor comprising a stator section including a piezo-electric element to which a motor drive voltage having a predetermined frequency is applied and a rotor section rotationally driven by longitudinal and torsional vibrations resulting from the application of the motor drive voltage to the piezo-electric element, said drive circuit comprising:

a torsional vibration in sensor for detecting the torsional vibration in said stator section; and frequency control means for controlling the frequency of said motor drive voltage such that the phase difference between the motor drive voltage signal and the detection signal detected by said torsional vibration sensor will be within a given range of an optimum phase angle of a α degree so as to provide maximum efficiency.

12. A drive circuit as defined in claim 11 wherein said frequency control means comprises a phase difference detecting section for detecting a phase angle φ which corresponds to the phase difference between the motor drive voltage signal and the detection signal detected by said torsional vibration sensor; and a frequency regulating section for controlling the frequency of said motor drive voltage such that the phase angle φ detected by said phase difference detecting section will be a fixed angle α so as to provide maximum efficiency.

13. A drive circuit as defined in claim 11 wherein said torsional vibration sensor is fixedly mounted on the side of said stator section at a location that is generated by the vibration.

14. A drive circuit as defined in claim 12 wherein said phase difference detecting section comprises phase-shifting circuit means for shifting the phase of said motor drive voltage signal V1 and the phase of the detection signal V2 of the torsional vibration sensor;

and a phase comparator for detecting the phase difference between the detection signals V1 and V2 of said phase-shifting circuit means, and wherein said frequency regulating section is effective to control the frequency of the motor drive voltage such that the phase difference detected by said phase comparator becomes zero, so that the signal V1 is shifted relative to the detection signal V2 by a fixed angle of α degree.

15. A drive circuit as defined in claim 14 wherein said frequency regulating section comprises a signal converting section for converting the phase difference detected by said phase comparator into a control voltage signal; a voltage control oscillator for outputting oscillation frequencies controlled based on said control voltage signal; and a power amplifier for amplifying the oscillation output of said voltage control oscillator up to a drive voltage, said drive voltage being then applied to said piezo-electric element means.

16. A drive circuit as defined in claim 11, further comprising sensor output discriminating means for discriminating whether said detection signal is in the active area wherein the motor is controllable or in the dead area wherein the motor is difficult to control, and wherein said frequency control means is effective to control the frequency of the motor drive voltage such that the detection signal of said vibration sensor is in the dead area and to control the frequency of the motor drive voltage such that the phase difference between said motor drive voltage signal and the detection signal of said torsional vibration sensor is within a given range of an optimum phase angle of α degree so as to provide maximum efficiency when the detection signals are in the active area.

17. A drive circuit as defined in claim 16, wherein said frequency control means comprises a phase difference detecting section for detection a phase angle φ corresponding to the phase difference between the motor drive voltage signal and the detection signal of said torsional vibration sensor; and a frequency regulating section for controlling the frequency of the motor drive voltage such that the detection signal of said vibration sensor is moved into the active area when the detection signal is in the dead area and for controlling the frequency of the motor drive voltage such that the phase angle φ detected by said phase difference detecting section is within a given range of an optimum phase angle of α degree so as to provide maximum efficiency when the detection signal is in the active area.

18. A drive circuit as defined in claim 17 wherein said frequency regulating section is effective to move the frequency of the motor drive voltage between predetermined upper- and lower-limit frequencies such that the detection signal detected by said vibration sensor moves into the active area when it is in the dead area.

19. A drive circuit as defined in claim 16 wherein said torsional vibration sensor is fixedly mounted on the side of said stator section at a location that is vibrated by the torsional vibration.

20. A drive circuit as defined in claim 17 wherein said phase difference detecting section comprises phase-shifting circuit means for shifting the phase of said motor drive voltage signal V1 and the phase of the detection signal V2 of the torsional vibration sensor;

and a phase comparator for detecting the phase difference between the detection signals V1 and V2 of said phase-shifting circuit means, and wherein said frequency regulating section is effective to control the frequency of the motor drive voltage such that so that the detection signal of said vibration sensor moves into the active area when it is in the dead area and to control the frequency of the motor drive voltage such that the phase difference detected by said phase comparator becomes zero when the detection signal of said vibration sensor is in the active area, so that the signal V1 is shifted relative to the detection signal V2 by a fixed angle of α degree.

* * * * *